(12) United States Patent
Sunkada Gopinath

(10) Patent No.: US 12,719,799 B2
(45) Date of Patent: Aug. 25, 2026

(54) METHODS AND APPARATUSES FOR MANAGING TCP ACK PACKETS

(71) Applicant: SAMSUNG ELECTRONICS CO., LTD., Suwon-si (KR)

(72) Inventor: Srihari Das Sunkada Gopinath, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 18/733,355

(22) Filed: Jun. 4, 2024

(65) Prior Publication Data

US 2025/0126067 A1 Apr. 17, 2025

(30) Foreign Application Priority Data

Oct. 12, 2023 (IN) ............................ 202341068510

(51) Int. Cl.
*H04L 47/193* (2022.01)
*H04L 47/28* (2022.01)

(52) U.S. Cl.
CPC ............ *H04L 47/193* (2013.01); *H04L 47/28* (2013.01)

(58) Field of Classification Search
CPC ..... H04W 80/06; H04W 72/21; H04W 72/23; H04W 28/06; H04W 28/02; H04W 28/0273; H04W 80/02; H04W 76/27; H04W 28/0268; H04W 76/15; H04W 28/0278; H04W 72/04; H04W 72/1268; H04W 74/0833; H04W 76/10; H04W 4/70; H04W 28/12; H04W 72/12; H04W 72/569; H04W 28/04; H04W 72/0446;
(Continued)

(56) References Cited

U.S. PATENT DOCUMENTS 9,049,017 B2 6/2015 Speight
10,027,593 B2 * 7/2018 Zhang .................. H04L 1/1841
(Continued)

FOREIGN PATENT DOCUMENTS

WO 2020/092357 A1 5/2020

OTHER PUBLICATIONS

Website, Browne et al., "SYN/ACK in the TCP Protocol", Baeldung on Computer Science, Jun. 18, 2023, 5 total pages, https://www.baeldung.com/cs/tcp-protocol-syn-ack.

(Continued)

*Primary Examiner* — Djenane M Bayard
(74) *Attorney, Agent, or Firm* — Sughrue Mion, PLLC

(57) ABSTRACT

A method for managing transmission control protocol acknowledgement (TCP ACK) packet processing by a receiver device, including: receiving a plurality of data packets from a transmitter device at a packet data convergence protocol (PDCP) layer of the receiver device, each of the plurality of data packets including a PDCP header; determining whether a reorder timer of the PDCP layer is running or started based on PDCP sequence numbers of the received plurality of data packets included in the PDCP header; identifying, based on a determination that the reorder timer of the PDCP layer is running or started, one or more TCP ACK packets among the received plurality of data packets; and transferring, one or more identified TCP ACK packets to an upper layer without waiting for an expiry of the reorder timer of the PDCP layer.

20 Claims, 16 Drawing Sheets

(58) Field of Classification Search
CPC ... H04W 28/065; H04W 8/04; H04W 88/085; H04W 28/10; H04W 74/0838; H04W 84/042; H04W 88/08; H04W 80/08; H04W 28/0231; H04W 28/0236; H04W 28/24; H04W 28/26; H04W 36/08; H04W 52/0229; H04W 88/02; H04W 72/20; H04W 28/0263; H04W 72/52; H04W 76/11; H04L 47/34; H04L 5/0055; H04L 69/16; H04L 1/1854; H04L 69/04; H04L 69/163; H04L 69/321; H04L 69/22; H04L 1/1812; H04L 47/193; H04L 69/40; H04L 47/32; H04L 47/27; H04L 47/323; H04L 1/1848; H04L 1/1893; H04L 5/0053; H04L 1/188; H04L 1/0006; H04L 12/4604; H04L 2027/003; H04L 25/02; H04L 27/0002; H04L 27/26; H04L 27/2634; H04L 5/003; H04L 1/18; H04L 1/1887; H04L 1/1864; H04L 47/24; H04L 1/1642; H04L 1/1861; H04L 1/1874; H04L 1/1635; H04L 1/1832; H04L 47/28; H04L 1/00; H04L 1/16; H04L 47/23; H04L 47/2483; H04L 47/11; H04L 47/31; H04L 67/59; H04L 69/168; H04L 47/2466; H04L 12/18; H04L 12/6418; H04L 43/0888; H04L 47/2441; H04L 47/283; H04L 1/1607; H04L 1/1614; H04L 1/1829; H04L 1/203; H04L 12/00; H04L 43/0829; H04L 45/24; H04L 45/302; H04L 45/308

See application file for complete search history.

(56) References Cited

U.S. PATENT DOCUMENTS

| | | | | |
|---|---|---|---|---|
| 11,202,279 | B2 * | 12/2021 | Kim | H04L 69/22 |
| 2018/0317236 | A1 * | 11/2018 | Yang | H04L 47/28 |
| 2019/0044880 | A1 | 2/2019 | Yi et al. | |
| 2020/0169916 | A1 * | 5/2020 | Gholmieh | H04W 12/106 |
| 2020/0229026 | A1 * | 7/2020 | Parron | H04W 72/23 |
| 2022/0337337 | A1 * | 10/2022 | Xu | H04L 1/0045 |
| 2024/0014939 | A1 * | 1/2024 | Vangala | H04L 1/1635 |

OTHER PUBLICATIONS

Website, Pennington et al., "What is the total length of pure TCP Ack sent over ethernet?", Stack Overflow, Jun. 13, 2015, 2 total pages, https://stackoverflow.com/questions/5543326/what-is-the-total-length-of-pure-tcp-ack-sent-over-ethernet.

Website, Singhal, "TCP Header | TCP Header Format | TCP Flags", Gate Vidyalay, 34 total pages, https://www.gatevidyalay.com/transmission-control-protocol-tcp-header/, (retrieved Jan. 30, 2024.).

Website, Jaiswal, "Transmission Control Protocol", Meerut Institute of Engineering & Technology (MIET), 15 total pages, https://miet.ac.in/assets/uploads/os/TCP.pdf (document created Apr. 14, 2021).

Website, "TCP Congestion Control", GeeksforGeeks, Jun. 16, 2023, 15 total pages, https://www.geeksforgeeks.org/tcp-congestion-control/.

* cited by examiner

METHODS AND APPARATUSES FOR MANAGING TCP ACK PACKETS

CROSS-REFERENCE TO RELATED APPLICATION

This application is based on and claims priority under 35 U.S.C. § 119 to Indian Patent Application number 202341068510, filed on Oct. 12, 2023, in the Indian Patent Office, the disclosure of which is incorporated by reference herein in its entirety.

BACKGROUND

1. Field

The present disclosure relates to a field of wireless communication methods and systems, and more particularly relates to methods and systems for efficiently managing Transmission Control Protocol (TCP) Acknowledgement (ACK) packets in a Packet Data Convergence Protocol (PDCP) layer of a wireless communication network.

2. Description of Related Art

Mobile phone usage has grown exponentially over the years since the advent of 4G and 5G. Mobile phone usage is set to increase further with more rollout of 5G services and beyond 5G. The increased use of multiple mobile apps, various applications, and services has increased a huge load on network protocols and user experience. With increased usage of available services and applications, a single user will tend to have multiple streams of Internet Protocol (IP) flow and applications supported over a single Packet Data Unit (PDU) session.

Applications of similar Quality of Service (QOS) requirements get mapped to a single Data Radio Bearer (DRB) over a Radio Access Network (RAN). The RAN manages data at the DRB level and doesn't know that there are multiple independent flows within the single DRB. An example diagram illustrating the mapping of the multiple IP Flows to the single DRB is shown in FIG. 1 and FIG. 3 of the drawings as per an existing scenario. As shown in FIG. 3, a single PDU session (Internet PDU session) can handle Internet traffic on a commercial device, and only voice streams and video streams (IMS PDU) are shared via a separate IMS PDU session.

Taking data plane module functionalities of the 5G New Radio (NR) into consideration, a schematic diagram depicting a layer 2 structure of the 5G NR with reference to the multiple protocol layers is shown in FIG. 2 of the drawings, in accordance with existing art. According to FIG. 2, the multiple protocol layers include protocol layers such as physical (PHY) layer, medium access control (MAC) layer, radio link control (RLC) layer, PDCP layer, and service data adaptation protocol (SDAP) layer. The SDAP layer maps multiple flows to the different or the same DRBs and the PDCP layer or an RLC layer provides services to upper layers by managing the DRBs. Further, the MAC layer multiplexes data from all DRBs and sends the data over the PHY layer. Also, as can be seen in FIG. 3, the multiple IP flows are mapped to the different or the same DRBs in SDAP in accordance with the layer 2 structure of 5G NR as shown in FIG. 2.

As per NR PDCP specification, the PDCP layer supports the reordering and in-order delivery of packets. In a NR specification, the PDCP layer delivers packets to upper layers for the configured DRB.

As NR RLC can deliver completely received PDUs to the PDCP layer in an out-of-order manner, the PDCP layer can detect reordering based on PDCP Sequence Number the received packets or missing packet(s) in the received packets and start a t-reordering timer. Further, the PDCP layer waits for the missing packet(s) to be recovered by lower layers. The packets may get lost or reordered at the PDCP layer due to various reasons. The PDCP has to wait for the recovery of those packets, which can either be recovered at the MAC layer using a Hybrid Automatic Repeat Request (HARQ) procedure, or at the RLC, using an Automatic Repeat Request (ARQ) procedure at the RLC.

In the PDCP reorder window, all the received out-of-order packets are buffered. When the missing packets are received at the PDCP layer, the t-Reordering timer is stopped. However, if the missing packets are still not recovered by the expiry of the t-Reordering timer then the PDCP layer considers the missing packets as lost and delivers the packets in the reordering window to the upper layer. In NR specification, the PDCP layer delivers packets to upper layers for the configured DRB. Within one DRB, for the PDU session, it is very likely to have data from the multiple independent flows. The data of a particular flow gets affected because of the PDCP functionality as PDCP waits for packet recovery even though there is no packet loss with respect to that flow but there is loss in another flow in the same DRB.

FIG. 4 illustrates an example flow diagram depicting a handling of data packets when the reorder timer running or the PDCP layer starts reordering timer, in accordance with the existing state of art. As shown in FIG. 5, the PDCP layer receives multiple data packets from a transmitter device. The PDCP layer in the receiving device determines whether the PDCP reorder timer is running or to be started based on packet sequence numbers of the received plurality of the data packets. If any of the data packet is missing then all data packets in PDCP reorder window waits for the missing packet to arrive until the PDCP reorder timer is expired. Further, if no packet is missing at the PDCP layer then the received data packets will be delivered to the upper layer.

As disclosed above in FIG. 4, any packet loss (missing data packet) in the single DRB flow would delay a packet delivery for all data streams within the single DRB as the PDCP Receiver (RX) waits for the re-ordering timer to expire. This delay can lead to various error recovery mechanisms getting triggered for individual data streams, depending on transport layer protocols like TCP or application layer handling. FIG. 5 illustrates a diagram depicting an error recovery mechanism that is triggered due to a packet loss in the single DRB flow, in accordance with the existing state of the art. In an example, as shown in FIG. 5, a packet is lost (missing packet) in a DRB flow and the error recovery mechanism is triggered, as a result of which the re-ordering timer of the PDCP reorder window is started. In an example as shown in FIG. 5, data packets of flow 1 and flow 2 are received at a PDCP layer of a receiver device in the PDCP reorder window. Further, it can be seen from FIG. 5 that a packet PDCP SN-2 is missing in the PDCP reorder window, which results in waiting for the missing packet to arrive in the PDCP reorder window. Such packet loss can affect other TCP streams in the same DRB like flow 2. For example, TCP ACK Only packets like PDCP SN-4, and PDCP SN-5 correspond to packets without any data and still waiting in the PDCP reordering window due to triggering of the error recovery mechanism at the PDCP layer of the receiver device.

The intention of PDCP reordering support is to provide in order delivery of packets to the application. But TCP ACK only packets does not carry data. Instead, the TCP ACK only packets help a TCP server in reaching higher throughput and efficient RTT calculations. Further, the PDCP reordering mechanism makes all the packets in the reordering window wait until the missing packet is found. Therefore, if the TCP ACK only packets get stuck in the reordering process, it may lead to delayed ACK reception at the server, leading to increased round-trip time (RTT) calculation. It may also cause slower error recovery mechanisms of TCP like retransmissions. As a result, it may also lead to a slower increase in a TCP congestion window thereby reducing an overall TCP throughput.

In a non-limiting example, if there are 2 TCP sessions at a User Equipment (UE) i.e., TCP-A and TCP-B. The TCP-A session relates to uploading (UL), wherein the UE is uploading some data to a server-A and TCP-B relates to downloading DL and the UE is downloading some data from a server-B. Assuming that the TCP-B is in the slow start phase and the TCP congestion window=1024. e.g., server-B can send 1024 packets without waiting for ACK and the observed RTT is 100 ms and the PDCP reorder timer=50 ms. Now, assuming that a packet in the same radio bearer that has both TCP-A and TCP-B streams in it gets lost on the way from UE to RAN, then the RAN PDCP waits for 50 ms for the packet to be recovered. If there are ACKs in the PDCP reorder window at that time, then the server-B has to wait for additional 50 ms i.e., a total of 150 ms without transmitting anything, which results in increased RTT for the packets waiting at the PDCP reordering window which Server-B has sent.

Therefore, there lies a need for an improved method and system for handling the TCP ACK packets that does not carry any data which can effectively improve the overall TCP throughput by properly increasing a server-side TCP congestion window and a receiver advertised window.

SUMMARY

A method for managing transmission control protocol acknowledgement (TCP ACK) packet processing by a receiver device, including: receiving a plurality of data packets from a transmitter device at a packet data convergence protocol (PDCP) layer of the receiver device, each of the plurality of data packets including a PDCP header; determining whether a reorder timer of the PDCP layer is running or started based on PDCP sequence numbers of the received plurality of data packets included in the PDCP header; identifying, based on a determination that the reorder timer of the PDCP layer is running or started, one or more TCP ACK packets among the received plurality of data packets; and transferring, one or more identified TCP ACK packets to an upper layer without waiting for an expiry of the reorder timer of the PDCP layer.

The method may include wherein identifying one or more TCP ACK packets includes: parsing IP header information and TCP header information corresponding to each data packet of a corresponding data radio bearer (DRB); and analyzing, a bit sequence of the IP header information and the TCP header information, corresponding to the each data packet of the plurality of data packets.

The method may include wherein: the IP header information includes an IP header and the TCP header information includes a TCP header, and analyzing the bit sequence of the IP header and the TCP header includes: determining, corresponding to the each data packet, whether a transport protocol in the IP header is TCP and a total length in the IP header is equal to a sum of a length of the IP header and a length of the TCP header; determining, corresponding to the each data packet among the plurality of data packets, whether a TCP ACK bit in the TCP header is SET; and identifying, as the one or more TCP ACK packets, a set of data packets among the plurality of data packets based on a determination that the transport protocol in the IP header is TCP, the total length in the IP header is equal to the sum of the length of the IP header and the length of the TCP header, and the TCP ACK bit in the TCP header is SET.

The method may include wherein each of the one or more TCP ACK packets includes information including an acknowledgment without any data.

The method may include wherein a size of the PDCP sequence numbers can be one of 12 bits or 18 bits.

The method may include wherein the PDCP header of each of the one or more TCP ACK packets comprise a reserved bit set to ‘1’ to indicate a TCP ACK packet.

The method may include wherein identifying the one or more TCP ACK packets comprises determining whether each of the received plurality of data packets includes the reserved bit set to ‘1’ to indicate the TCP ACK packet.

A method for managing a transmission of data packets at a Packet Data Convergence Protocol (PDCP) transmitter device and packet processing at a PDCP receiver device, the method including: receiving, in a PDCP layer at the PDCP transmitter device, a plurality of data packets in a bit sequence from an upper layer, wherein each data packet among the plurality of data packets includes Internet Protocol (IP) header information and Transmission Control Protocol (TCP) header information; identifying one or more TCP ACK packets among the plurality of data packets based on IP header information and TCP header information; setting to ‘1’ a reserved bit in a PDCP header of each of the one or more identified TCP ACK packets indicating a TCP ACK packet; transferring, to a Radio link control (RLC) layer of the PDCP transmitter device, the plurality of data packets along with the one or more identified TCP ACK packets corresponding to which the reserved bit in the PDCP header is set to ‘1’; receiving, by the PDCP receiver device from the PDCP transmitter device, the plurality of data packets each including the PDCP header; determining whether a reorder timer of the PDCP layer is running or starting to run based on PDCP sequence numbers of the received plurality of data packets included in the PDCP header; identifying one or more TCP ACK packets among the plurality of data packets, based on a value of bit in the reserved bit of the PDCP header of each of the plurality of data packets; and transferring, the one or more identified TCP ACK packets to the upper layer without waiting for an expiry of the reorder timer of the PDCP layer.

The method may include wherein the IP header information includes an IP header and the TCP header information includes a TCP header, and identifying one or more TCP ACK packets includes: determining, corresponding to the each data packet, whether a transport protocol in the IP header is TCP and a total length in the IP header is equal to a sum of a length of the IP header and a length of the TCP header; and identifying, as the one or more TCP ACK packets, a set of data packets among the plurality of data packets based on a determination that the transport protocol in the IP header is TCP and the total length in the IP header is equal to the sum of the length of the IP header and the length of the TCP header.

The method may include wherein each of the one or more TCP ACK packets corresponds to a packet that includes information including an acknowledgement without data.

The method may include wherein: the setting of the reserved bit in the PDCP header corresponds to setting one of a PDCP reserved bit as '1' to indicate the TCP ACK packet, and the PDCP reserved bit is referred to as an TCP ACK bit.

A method implemented in a communication system for efficient management of Transmission Control Protocol Acknowledgement (TCP ACK) packets processing, the method including: setting, by a Packet Data Convergence Protocol (PDCP) transmitter device of the communication system and receiver device of the communication system, a dedicated bearer as a TCP ACK bearer for handling of TCP ACK packets; receiving, by the PDCP transmitter device, in a PDCP layer or an upper layer to the PDCP layer, a plurality of data packets in a bit sequence from the upper layer, wherein each data packet among the plurality of data packets includes Internet Protocol (IP) header information and Transmission Control Protocol (TCP) header information; identifying, by the PDCP transmitter device, one or more TCP ACK packets among the plurality of data packets based on IP header information and TCP header information; directing, by the PDCP transmitter device, the TCP ACK packets to the TCP ACK bearer; transferring, to a lower layer by the PDCP transmitter device, the one or more TCP ACK packets over the TCP ACK bearer; and configuring, by a PDCP receiver device of the communication system, one of PDCP reordering timeout to '0' ms for the TCP ACK bearer, or no PDCP reordering mechanism functionality for the TCP ACK bearer.

The method may include wherein each TCP ACK packet corresponds to a packet that includes information including an acknowledgement without data.

A receiver device for managing transmission control protocol acknowledgement (TCP ACK) packet processing, the receiver device including: memory storing instructions; one or more processors configured to, when executing the instructions, cause the receiver device to perform operations comprising: receiving a plurality of data packets from a transmitter device at a packet data convergence protocol (PDCP) layer of the receiver device, each of the plurality of data packets including a PDCP header; determining whether a reorder timer of a PDCP layer is running or started based on packet sequence numbers of the received plurality of data packets included in the PDCP header; identifying, based on a determination that the reorder timer of the PDCP layer is running or started, one or more TCP ACK packets among the received plurality of data packets; and transferring, one or more identified TCP ACK packets to an upper layer without waiting for an expiry of the reorder timer of the PDCP layer.

The receiver device may include wherein identifying the one or more TCP ACK packets comprises: parsing IP header information and TCP header information corresponding to each data packet of a corresponding data radio bearer (DRB); and analyzing, bit sequence of the IP header information and the TCP header information, corresponding to the each data packet of the plurality of data packets.

The receiver device may include wherein: the IP header information includes an IP header and the TCP header information includes a TCP header, and wherein analyzing the bit sequence of the IP header and the TCP header comprises: determining, corresponding to the each data packet, whether a transport protocol in the IP header is TCP and a total length in the IP header is equal to a sum of a length of the IP header and a length of the TCP header; determining, corresponding to the each data packet among the plurality of data packets, whether a TCP ACK bit in the TCP header is SET; and identifying, as the one or more TCP ACK packets, a set of data packets among the plurality of data packets based on a determination that the transport protocol in the IP header is TCP, the total length in the IP header is equal to the sum of the length of the IP header and the length of the TCP header, and the TCP ACK bit in the TCP header is SET.

The receiver device may include wherein each the one or more TCP ACK packets includes information including an acknowledgment without data.

The receiver device may include wherein a size of the PDCP sequence numbers is one of 12 bits or 18 bits.

The receiver device may include wherein identifying the one or more TCP ACK packets comprises determining whether each of the received plurality of data packets includes the reserved bit set to '1' to indicate the TCP ACK packet.

A communication system, including: a transmitter device including at least one first processor; and a receiver device including at least one second processor, wherein: the at least one first processor is configured to: receive, in a PDCP layer, a plurality of data packets in a bit sequence from an upper layer, wherein each data packet among the plurality of data packets includes Internet Protocol (IP) header information and Transmission Control Protocol (TCP) header information; identify one or more TCP ACK packets among the plurality of data packets based on the IP header information and TCP header information; set to '1', a reserved bit in a PDCP header of each of the one or more identified TCP ACK packets indicating a TCP ACK packet; transfer, to a Radio link control (RLC) layer of the transmitter device, the plurality of data packets along with the one or more identified TCP ACK packets corresponding to which the reserved bit in the PDCP header is set to '1', and the at least one second processor is configured to: receive the plurality of data packets each including the PDCP header; determine whether a reorder timer of the PDCP layer is running or starting to run based on packet sequence numbers of the received plurality of data packets included in the PDCP header; identify the one or more TCP ACK packets among the plurality of data packets, based on a value of bit in the reserved bit of the PDCP header of each of the plurality of data packets; and transfer, the one or more identified TCP ACK packets to the upper layer without waiting for an expiry of the reorder timer of the PDCP layer.

The communication system may include wherein the each of the one or more identified TCP ACK packets corresponds to a packet that includes information related to acknowledgement without data.

The communication system may include wherein: the setting of the reserved bit in the PDCP header corresponds to setting one of a PDCP reserved bit as '1' to indicate the TCP ACK packet, and the PDCP reserved bit is referred to as an TCP ACK bit.

A communication system, including: a transmitter device including at least one first processor; and a receiver device including at least one second processor, wherein: the at least one first processor is configured to: set a dedicated bearer as a TCP ACK bearer for handling of TCP ACK packets; receive, in a PDCP layer or an upper layer to the PDCP layer, a plurality of data packets in a bit sequence from the upper layer, wherein each data packet among the plurality of data packets includes Internet Protocol (IP) header information and Transmission Control Protocol (TCP) header information; identify one or more TCP ACK packets among the plurality of data packets based on the IP header information and TCP header information; direct the TCP ACK packets to the TCP ACK bearer; transfer to a lower layer by a PDCP transmitter device, the one or more TCP ACK packets over the TCP ACK bearer; and the at least one second processor is configured to configure one of an PDCP reordering timeout to '0' ms for the TCP ACK bearer, or no PDCP reordering mechanism functionality for the TCP ACK bearer.

The communication system may include wherein each of the one or more TCP ACK packets corresponds to a packet that includes information related to acknowledgment without data.

A method for managing Transmission Control Protocol (TCP) packet processing at a Packet Data Convergence Protocol (PDCP) receiver device, including: receiving, from a transmitter device, a plurality of data packets each including a PDCP header; determining whether a reorder timer of the PDCP layer is running or starting to run based on PDCP sequence numbers of the received plurality of data packets included in the PDCP header identifying, based on a determination that the reorder timer of a PDCP layer is running or starting to run and a bit sequence of the PDCP header, one or more TCP packets having no data among the received plurality of data packets; and transferring, one or more identified TCP packets to an upper layer without waiting for an expiry of the reorder timer of the PDCP layer.

A non-transitory computer readable storage medium storing instructions which, when executed by one or more processors of a receiver device for managing transmission control protocol acknowledgement (TCP ACK) packet processing, cause the receiver device to perform operations, the operations comprising: receiving a plurality of data packets from a transmitter device at a packet data convergence protocol (PDCP) layer of the receiver device, each of the plurality of data packets including a PDCP header; determining whether a reorder timer of the PDCP layer is running or started based on PDCP sequence numbers of the received plurality of data packets included in the PDCP header; identifying, based on a determination that the reorder timer of the PDCP layer is running or started, one or more TCP ACK packets among the received plurality of data packets; and transferring, one or more identified TCP ACK packets to an upper layer without waiting for an expiry of the reorder timer of the PDCP layer.

To further clarify the advantages and features of the present disclosure, a description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
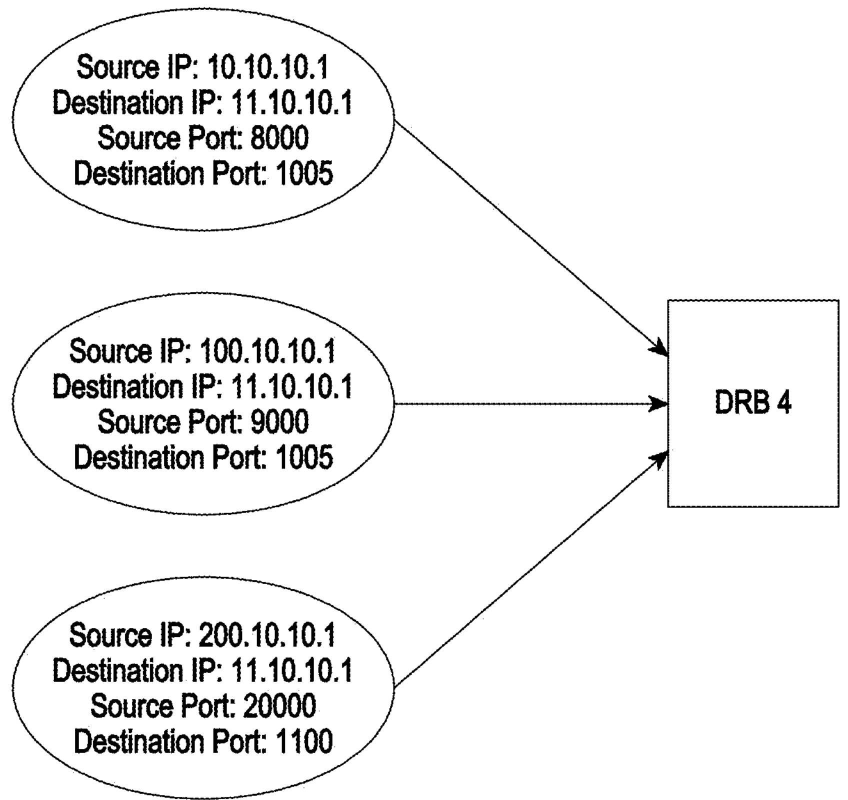
FIG. 1 illustrates an example diagram depicting a mapping of the multiple IP Flows to a single DRB, in accordance with the existing state of the art.
Figure 2:
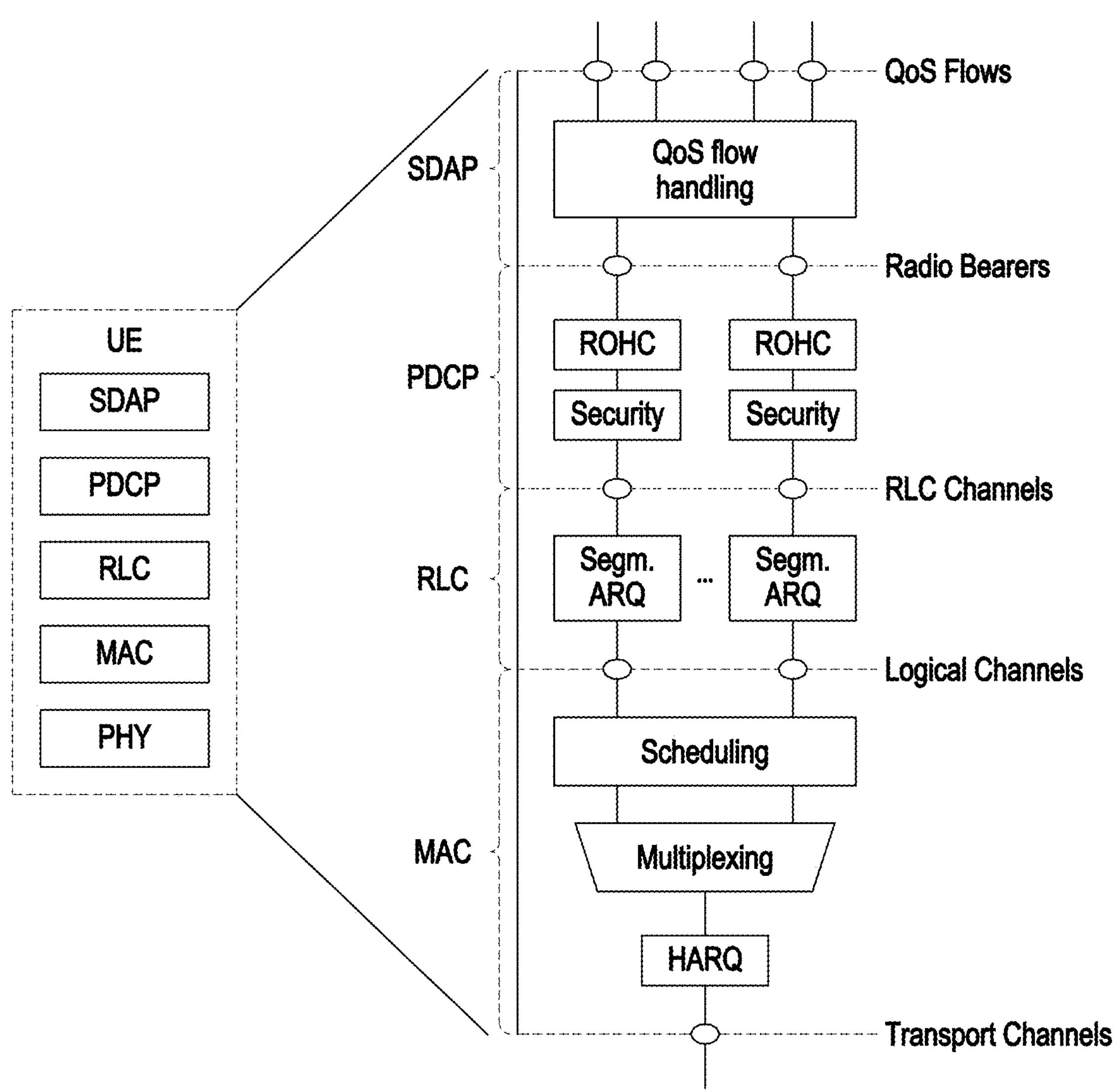
FIG. 2 illustrates a layer based diagram depicting a layer 2 structure of the 5G NR with reference to the multiple protocol layers such as PHY, MAC, RLC, PDCP, and SDAP, in accordance with an existing state of the art.
Figure 3:
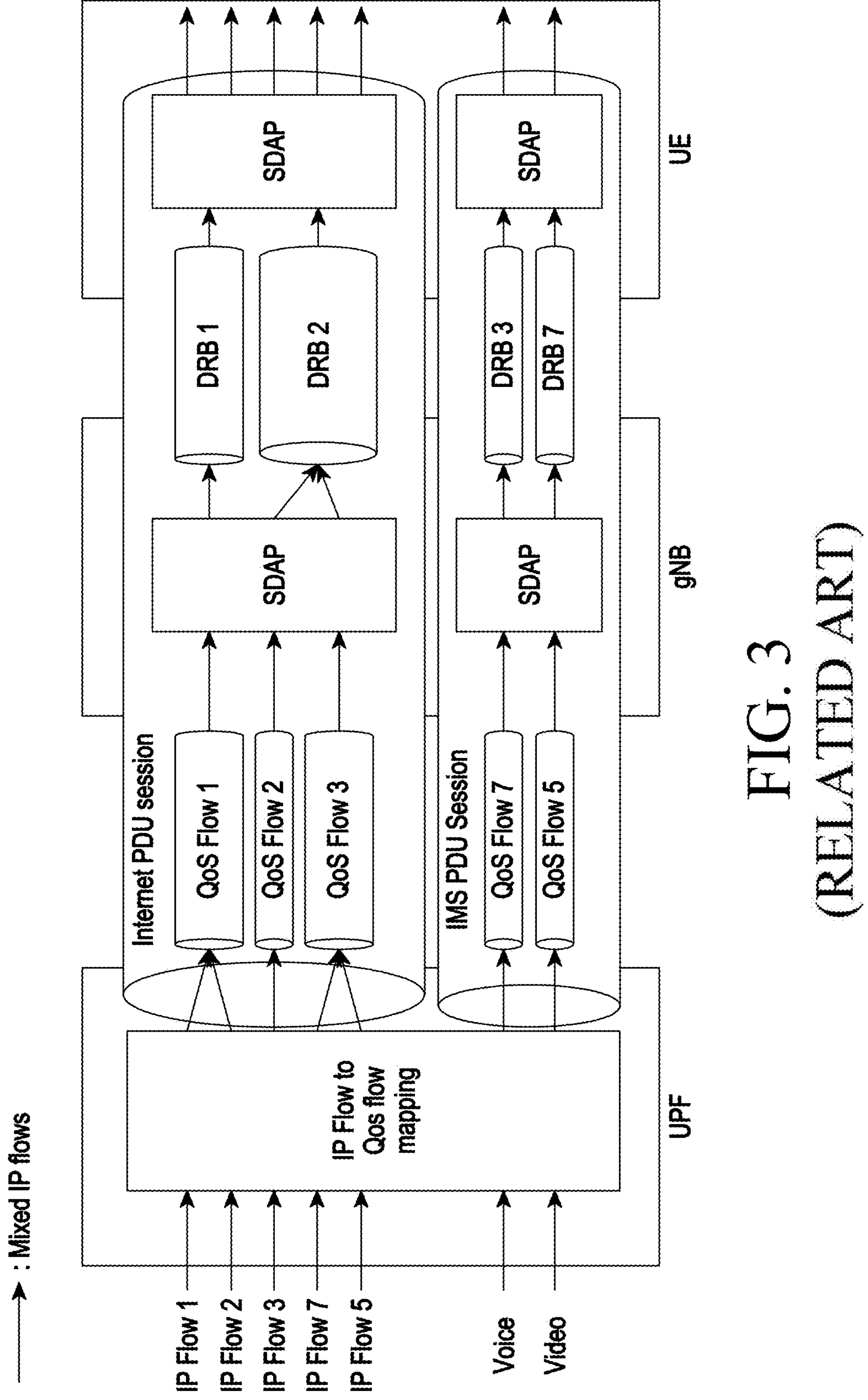
FIG. 3 illustrates a diagram depicting a mapping of the multiple IP flows to the different DRBs or the same DRBs using SDAP in accordance with the layer 2 structure of 5G NR of FIG. 1B, in accordance with the existing state of the art.
Figure 4:
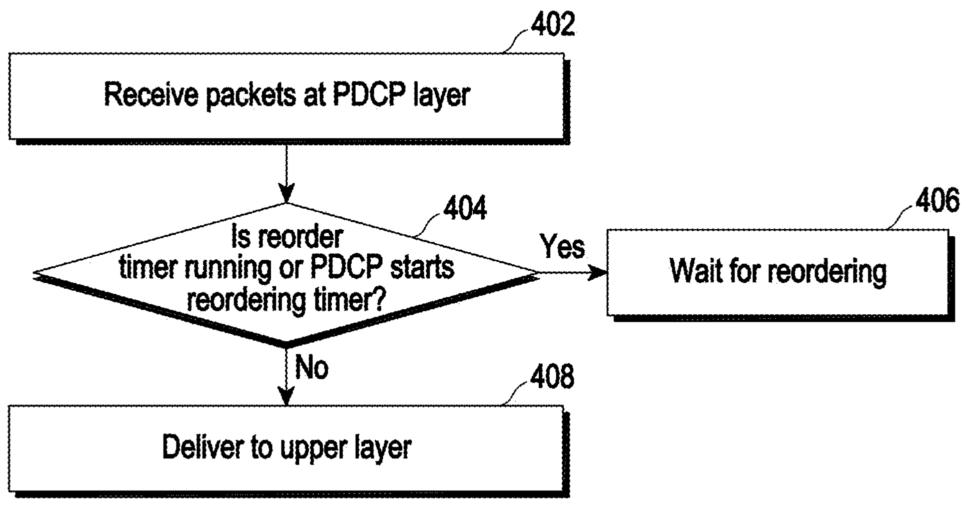
FIG. 4 illustrates an example flow diagram depicting a handling of data packets when the reorder timer running or the PDCP layer starts reordering timer, in accordance with the existing state of art.
Figure 5:
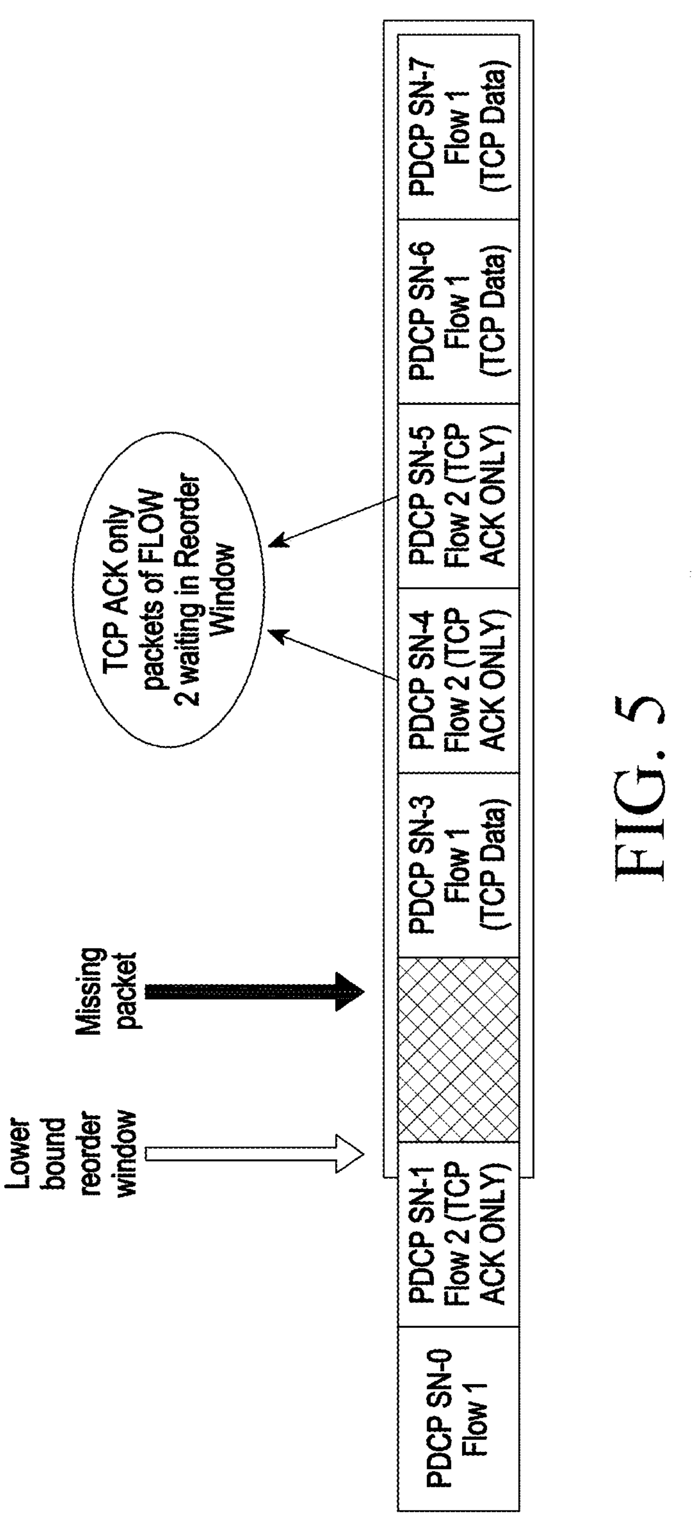
FIG. 5 illustrates a diagram depicting an error recovery mechanism that is triggered due to a packet loss in the single DRB flow, in accordance with the existing state of the art.

Further, skilled artisans will appreciate that elements in the drawings are illustrated for simplicity and may not have necessarily been drawn to scale. For example, the flow diagrams illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure to not obscure the drawings with details that will be readily apparent to those of ordinary skill in the art having the benefit of the description herein.

DETAILED DESCRIPTION

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In an embodiment, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

The term "some" or "one or more" as used herein is defined as "one", "more than one", or "all." Accordingly, the terms "more than one," "one or more" or "all" would all fall under the definition of "some" or "one or more". The term "an embodiment", "another embodiment", "some embodiments", or "in one or more embodiments" may refer to one embodiment or several embodiments, or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents. The phrase "exemplary" may refer to an example.

More specifically, any terms used herein such as but not limited to "includes," "comprises," "has," "consist," "have" and grammatical variants thereof do not specify an exact limitation or restriction and certainly do not exclude the possible addition of one or more features or elements, unless otherwise stated, and must not be taken to exclude the possible removal of one or more of the listed features and elements unless otherwise stated with the limiting language "mush comprise" or "needs to include".

Whether or not a certain feature or element was limited to being used only once, either way, it may still be referred to as "one or more features", "one or more elements", "at least one feature", or "at least one element." Furthermore, the use of the terms "one or more" or "at least one" feature or element does not preclude there being none of that feature or element unless otherwise specified by limiting language such as "there needs to be one or more" or "one or more element is required."

The terms "PDCP reorder window", "PDCP reordering window", "reordering window", and "reorder window" may be used as synonyms interchangeably throughout the description without deviating from the scope of the present disclosure.

The terms "PDCP reorder timer", "PDCP reordering timer", "reordering timer", and "reorder timer" may be used as synonyms interchangeably throughout the description without deviating from the scope of the present disclosure.

The terms "TCP ACK only packet" and "TCP ACK packet", may be used as synonyms interchangeably throughout the description without deviating from the scope of the present disclosure. The TCP ACK packet corresponds to a packet that includes information related to acknowledgment without any data.

The terms "receiving device", "PDCP receiving device", "PDCP receiver", and "PDCP receiver device", may be used as synonyms interchangeably throughout the description without deviating from the scope of the present disclosure.

The terms "transmitting device", "PDCP transmitting device", "PDCP transmitter", and "PDCP transmitter device", may be used as synonyms interchangeably throughout the description without deviating from the scope of the present disclosure.

The terms "packets", and "TCP packets", may be used as synonyms interchangeably throughout the description without deviating from the scope of the present disclosure.

Unless otherwise defined, all terms, and especially any technical and/or scientific terms, used herein may be taken to have the same meaning as commonly understood by one having ordinary skill in the art.

Embodiments of the present disclosure will be described below in detail with reference to the accompanying drawings.

Figure 6:
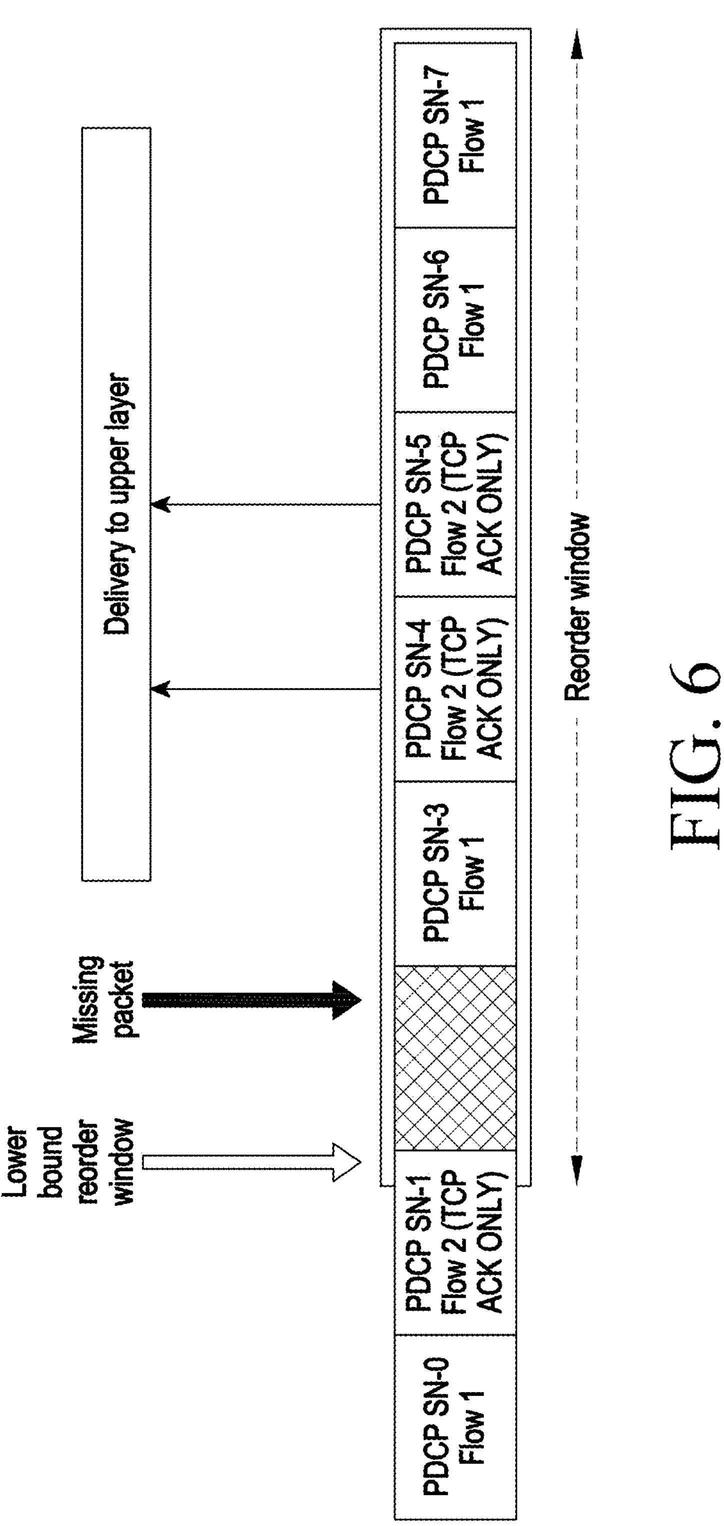
FIG. 6 illustrates a diagram depicting managing TCP ACK packets processing at a PDCP receiver device, in accordance with an exemplary embodiment of the present disclosure.

FIG. 6. illustrates a diagram depicting managing TCP ACK packets processing at a PDCP receiver device, in accordance with an exemplary embodiment of the present disclosure. In a non-limiting example as shown in FIG. 6, when a receiving device receives a plurality of data packets in a PDCP layer from a transmitting device. Each of the data packets includes a PDCP header. At the PDCP layer, the receiving device determines whether a PDCP reordering timer of the PDCP layer is running or started based on a PDCP sequence number of the received plurality of data packets included in the PDCP header. For instance, as per the example shown in FIG. 6, the receiving device determines that one of a packet among the received data packets is missing (PDCP SN 2) which results in a start of the PDCP reorder timer of the PDCP layer. Upon the determination that the packet PDCP SN 2 is missing, then the receiving device identifies that TCP ACK packets (such as PDCP SN 4 and PDCP SN 5) are present among the received plurality of the data packets. Accordingly, in view of the one or more embodiments disclosed below herein, the receiving device transfers each of the identified TCP ACK packets (PDCP SN 4 and PDCP SN 5) to the upper layer without waiting for the PDCP reordering timer to expire. This transfer results in a decrease in a time of the RTT calculation at a TCP server and a faster increase in processing of TCP packets in a congestion window of the TCP server which further results in higher throughput.

Now, methods and systems of the present disclosure depicting the management of a transmission of data packets at a transmitter device and management of TCP ACK packet processing at the receiving device will be explained below in detail in conjunction with FIGS. 7 through 16 of the drawings.

Figure 7:
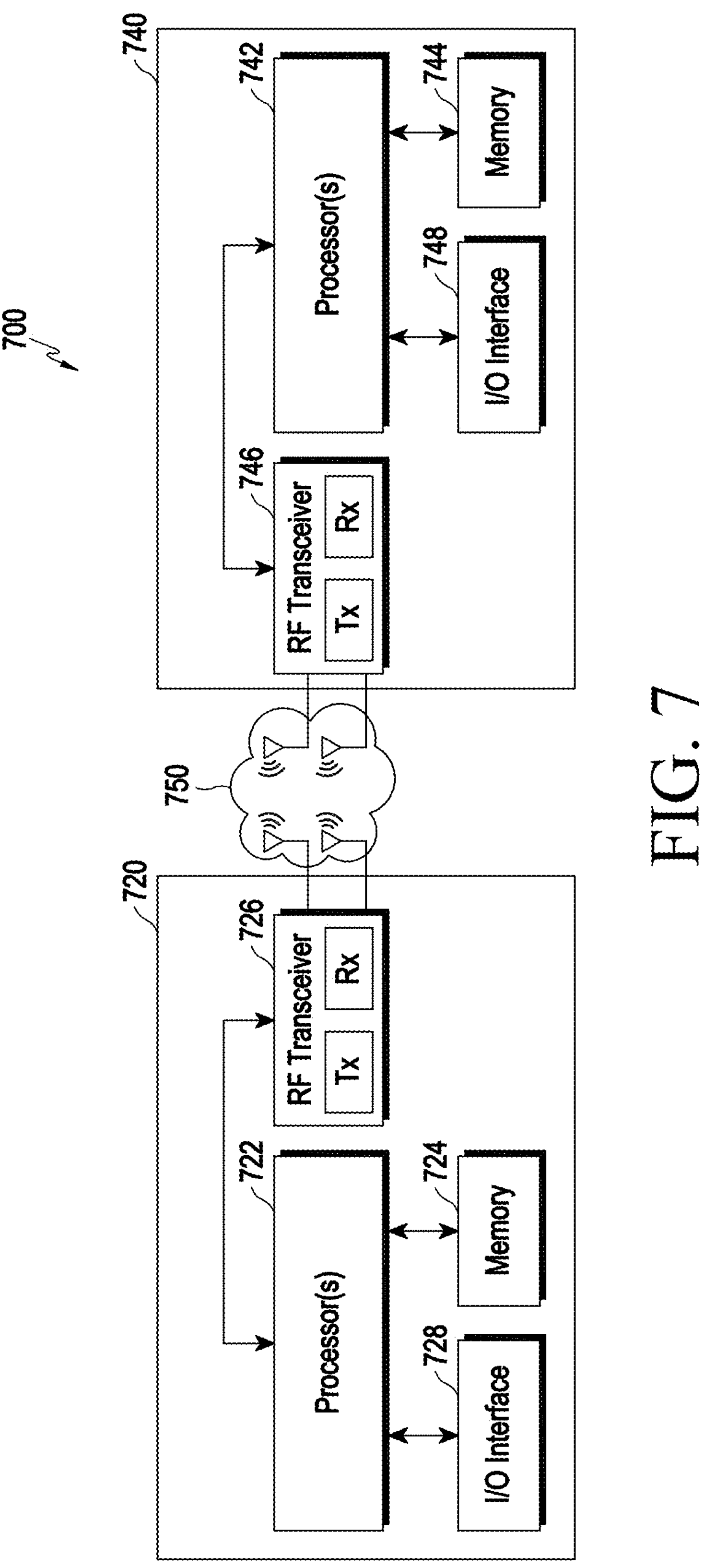
FIG. 7 illustrates a block diagram of a communication system including a transmitter device and a receiver device, in accordance with an embodiment of the present disclosure.

FIG. 7. illustrates a block diagram of a communication system including a transmitter device and a receiver device, in accordance with an embodiment of the present disclosure. The communication system 700 includes a transmitter device 720 and a receiver device 740. The transmitter device 720 of the communication system 700 includes a processor(s) 722 (may also be referred to as "one or more processors 722" or "at least one first processor 722"), a memory 724, a radio frequency (RF) transceiver circuit 726, and an Input/Output (I/O) interface 728. The receiver device 740 of the communication system 700 includes a processor(s) 742 (may also referred to as "one or more processors 742" or "at least one second processor 742"), a memory 744, a RF transceiver circuit 746, and an I/O interface 748. Each of the RF transceiver circuit 726 and the RF transceiver circuit 746 includes a transmitter (Tx) and a receiver (Rx). Therefore at times, the transmitter device 720 can also act as a receiver and the receiver device 740 can also act as a transmitter.

Each of the transmitter device 720 and the receiver device 740 are configured to communicate with each other via a network interface 750. As an exemplary embodiment, the transmitter device 720 corresponds to a network function (NF) or RAN node and the receiver device 740 may correspond to, but is not limited to, a smartphone, a mobile device, other mobile devices, a portable communication device, a laptop, a tablet, etc.

According to an embodiment, the RF transceiver circuit 726 is configured to communicate with the RF transceiver circuit 746 via the network interface 750. The RF transceiver circuit 746 may include a receiving channel for receiving downlink (DL) signals from the transmitter device 720 via the network interface 750. Further, the RF transceiver circuit 726 may include a transmission channel for transmitting uplink (UL) signals from the transmitter device 720 to the receiver device 740 via network interface 750.

According to an embodiment, the processor 722 may be operatively coupled to the RF transceiver circuit 726, the memory 724, and the I/O interface 728. The processor 722 may be configured for processing, executing, or performing a plurality of operations disclosed throughout the disclosure. According to an embodiment, the processor 722 may correspond at least one data processor for executing processes in the transmitter device 720. The processor 722 may correspond to processing units such as integrated system (bus) controllers, memory management control units, floating point units, graphics processing units, digital signal processing units, etc. In an embodiment, the processor 722 may correspond a central processing unit (CPU), a graphics processing unit (GPU), or both. Further, the processor 722 may be one or more general processors, digital signal processors, application-specific integrated circuits, field-programmable gate arrays, servers, networks, digital circuits, analog circuits, combinations thereof, or other now known or later developed devices for analyzing and processing data. The processor 722 may execute a software program, such as code generated manually (i.e., programmed) to perform the operation. Further, the processor 742 has the same configuration as that of the processor 722 and accordingly, a detailed description of the same is omitted herein for the sake of brevity of the present disclosure.

According to an embodiment, the memory 724 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 724 is communicatively coupled with the one or more processors 722 to store bitstreams or processing instructions for completing the process. Further, the memory 724 may include an operating system for performing one or more tasks of the communication system 700. The memory 724 may also store data blocks generated by the transmitter device 720 or the receiver device 740 for future processing. Further, the memory 744 has the same configuration as that of the memory 724 and accordingly, a detailed description of the same is omitted herein for the sake of brevity of the present disclosure.

According to an embodiment, the network interface 750 refers to any entity that performs one or more functionalities of a network connection between the transmitter device 720, the receiver device 740, and a plurality of base stations. Further, the network connection may be established between the transmitter device 720, the receiver device 740, and the plurality of base stations via a communication port or interface or using a bus. The communication port may be configured to connect with a network, external media, memory, or any other components in a system, or combinations thereof. The network connection may be a physical connection, such as a wired Ethernet connection, or may be established wirelessly. Likewise, the additional connections with other components of the communication system 700 may be physical or may be established wirelessly. The network may be directly connected to the bus.

According to an embodiment, the I/O interface 728 refers to hardware or software components that enable data communication in the transmitter device 720, other devices, or systems. The I/O interface 728 serves as a communication medium for exchanging information, commands, or data with the other devices or systems. The I/O interface 728 may be a part of the processor 722 or maybe a separate component. The I/O interface 728 may be created in software or maybe a physical connection in hardware. The I/O interface 728 may be configured to connect with an external network, external media, the display, or any other components, or combinations thereof. The external network may be a physical connection, such as a wired Ethernet connection, or may be established wirelessly. Further, the I/O interface 748 has the same configuration as that of the I/O interface 728 and accordingly, a detailed description of the same is omitted herein for the sake of brevity of the present disclosure.

Figure 8:
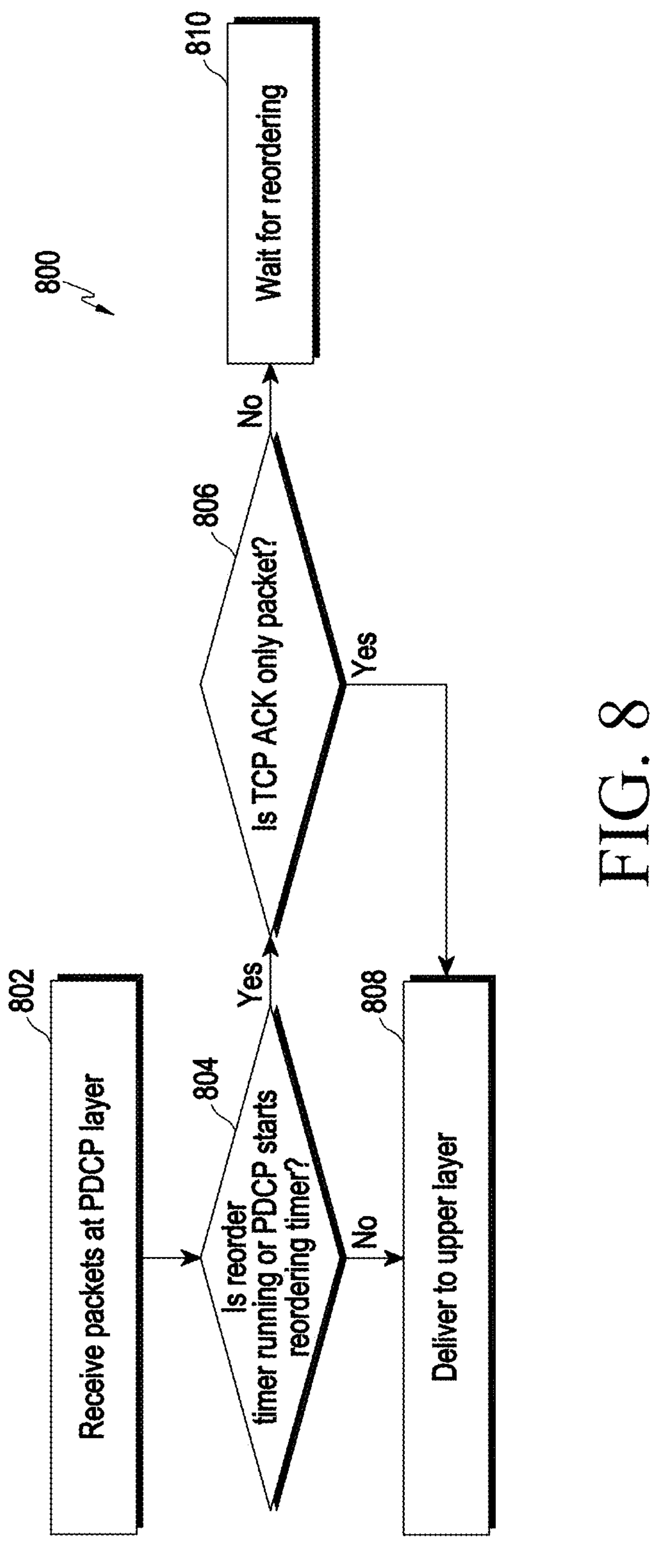
FIG. 8 is a flow diagram depicting a method for managing the TCP ACK packet processing at the PDCP receiver device, in accordance with an embodiment of the present disclosure.

FIG. 8 is a flow diagram depicting a method for managing the TCP ACK packet processing at the PDCP receiver device, in accordance with an embodiment of the present disclosure. The method 800 includes a series of operations 802 through 810 that are performed by the processor 742 of the receiver device 740.

At operation 802, the processor 742 receives the plurality of packets each including the PDCP header at the PDCP layer.

At operation 804, the processor 742 determines whether the PDCP reorder timer is running or the PDCP reorder timer has started at the PDCP layer based on PDCP sequence numbers of the received plurality of data packets. For instance, in an example, if one or more packet sequence numbers are missing in the PDCP reorder window, then the processor 742 may determine that the one or more packets are missing in the PDCP reorder window at the PDCP layer and accordingly trigger the PDCP reordering timer to start. A size of the Sequence Number (SN) in the PDCP header of the plurality of data packets can be one of 12 bits or 18 bits.

If a result of the determination at the operation 804 is "yes", then the flow of the method 800 proceeds to operation 806. Further, if the result of the determination at the operation 804 is "No", then the flow of the method 800 proceeds to operation 808.

At operation 806, the processor 742 determines if the received plurality of packets in the PDCP reordering window includes of the TCP ACK only packets or not. In an example, the TCP ACK packet corresponds to the packet that only includes information related to acknowledgment without any data. If at operation 806, it is determined that the PDCP reordering window includes of the one or more TCP ACK only packets, then the flow of the method proceeds to operation 808. Further, if the result of the determination at the operation 806 is "No", then the flow of the method 800 proceeds to the operation 810. In an example embodiment, for determining if the received plurality of packets in the PDCP reordering window includes of the TCP ACK only packets or not, at first, the processor 742 identify the one or more TCP ACK packets by parsing Internet Protocol (IP) header information and TCP header information corresponding to each data packet of a corresponding DRB at the receiver device 740. Secondly, the processor 742 analyzes a bit sequence of the parsed IP header information and the TCP header information corresponding to each data packet of the plurality of data packets. Thirdly, the processor 742 determines following conditions including whether the transport protocol in the IP header is TCP, whether a total length in the IP header is equal to a sum of a length of the IP header and a length of the TCP header, and whether the TCP ACK bit in the TCP header is SET. Thereafter, the processor 742 identifies, as the one or more TCP ACK packets, a set of data packets among the received plurality of data packets based on a result of the determination. In a non-limiting example, if the TCP ACK bit is not set for any packet in the TCP header, then the processor 742 will not consider that packet as TCP ACK packet.

At operation 808, the processor 742 transfers the one or more TCP ACK only packets in the PDCP reordering window from the PDCP layer to the upper layers without waiting for the expiry of the reorder timer of the PDCP layer.

Further, at the operation 810, the processor 742 waits for the missing packet to arrive or expiry of the PDCP reorder timer. Thereafter, the processor 742 transfers or delivers all the packets in the PDCP reordering window to the upper layers once the missing packet is arrived or the PDCP reorder timer is expired.

In one or more embodiments of the present disclosure, the process of sending the TCP packets to the upper layer is not only limited to TCP ACK packets but is also applicable for any TCP packets having no data and accordingly such packets can be delivered to the upper layer. In a non-limiting example, in view of the disclosed method, the processor 722, may identify one or more TCP packets having no data among the received plurality of data packets based on the bit sequence of the PDCP header and the determination that the reorder timer of the PDCP layer is running or started. Thereafter, the processor 722 may transfer the one or more identified TCP packets having no data to the upper layer without waiting for the expiry of the reorder timer of the PDCP layer.

Figure 9A:
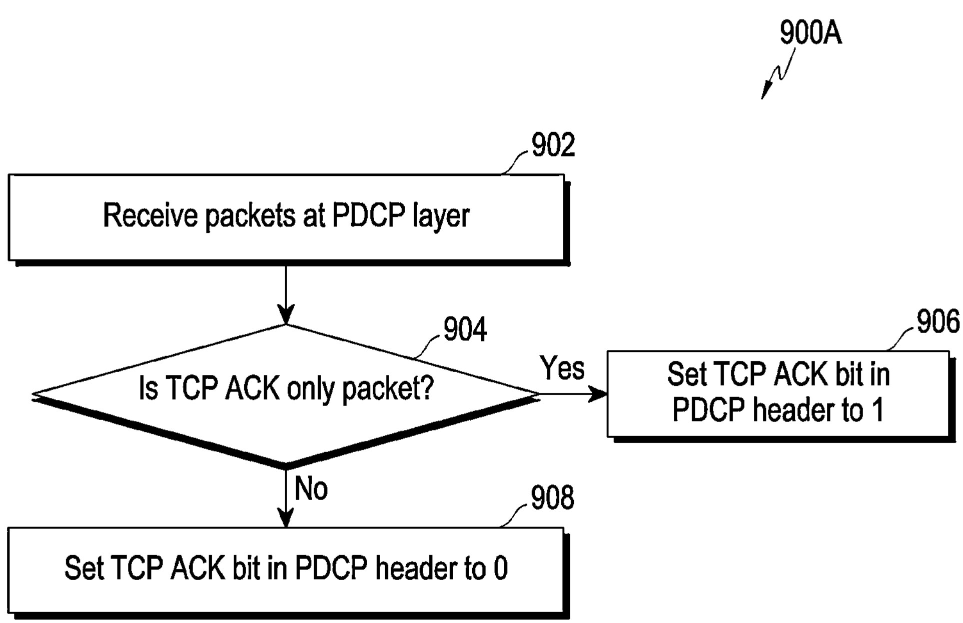
FIGS. 9A and 9B are flow diagrams illustrating a method for managing a transmission of data packets at a PDCP transmitter device and packet processing at the PDCP receiver device, respectively, in accordance with an embodiment of the present disclosure.
Figure 9B:
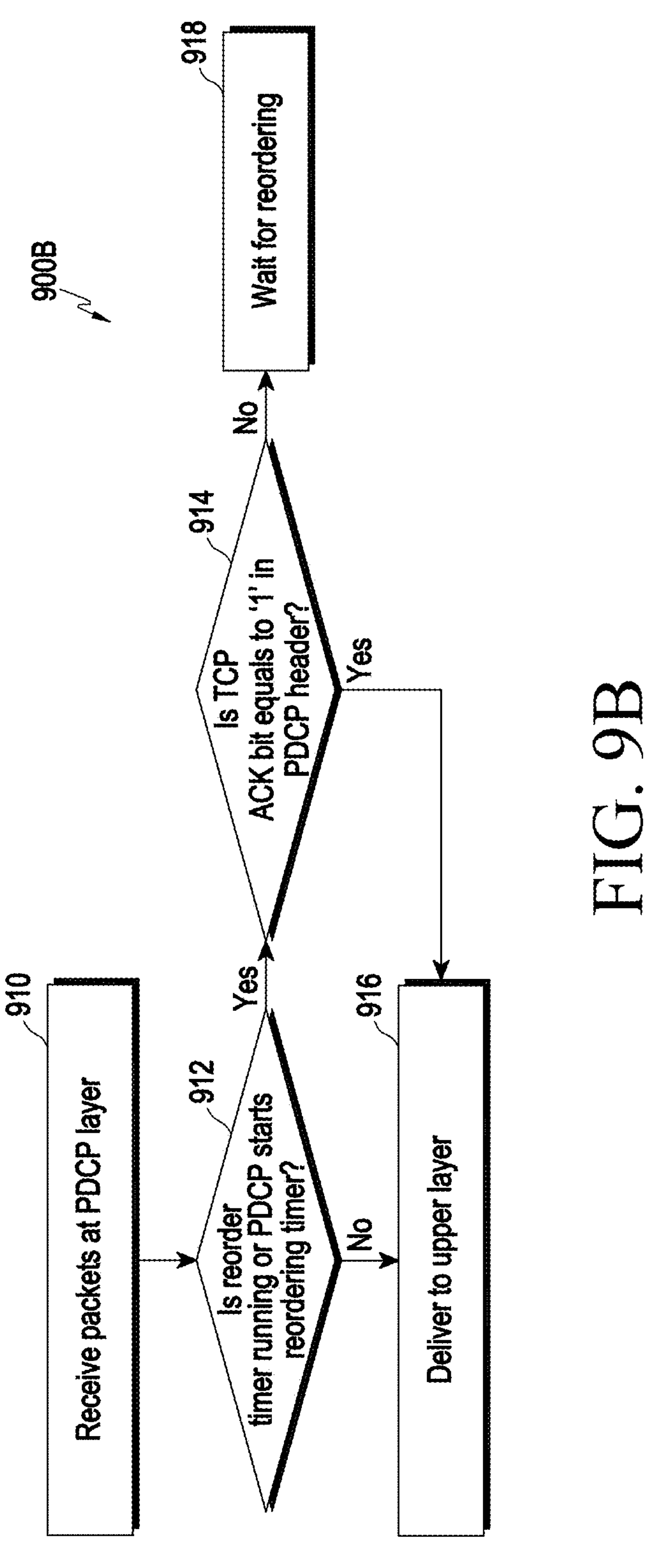

FIGS. 9A and 9B are flow diagrams illustrating a method for managing a transmission of data packets at a PDCP transmitter device and packet processing at the PDCP receiver device, respectively, in accordance with an embodiment of the present disclosure. The method 900A includes a series of operations 902 through 908 that are performed by the processor 722 of the transmitter device 720. Similarly, method 900B includes a series of operations 910 through 918 that are performed by the processor 742 of the receiver device 740.

In operation 902 of FIG. 9A, the processor 722 receives the plurality of packets wherein each packet includes IP header information and TCP header information. At operation 904, in which the processor 722 determines if the plurality of packets received includes of the one or more TCP ACK only packets or not. In an example, the TCP ACK packet corresponds to the packet that includes information related to acknowledgment without any data.

If a result of the determination at the operation 904 is "yes", then the flow of the method 900A proceeds to operation 906. Further, if the result of the determination at the operation 904 is "No", then the flow of the method 900 proceeds to operation 908.

At operation 906, if it is determined by the processor 722 that one or more TCP ACK packets are present in the plurality of the received packets then setting to '1' one of a reserved bit (TCP ACK bit) in the PDCP header of each of the one or more identified TCP ACK packets indicating the TCP ACK packet. However, in operation 908, if it is determined by the processor 722 that no TCP ACK packets are present in the plurality of the received packets then setting to '0' one of the reserved bit (TCP ACK bit) in the PDCP header.

In operation 910 of FIG. 9B, the processor 742 receives the plurality of packets each including the PDCP header at the PDCP layer from the PDCP transmitter device. In other words, the processor 742 receives the value of PDCP header which has been determined from the operation 906 or 908.

At operation 912, the processor 742 determines whether the PDCP reorder timer is running or the PDCP reorder timer has started at the PDCP layer based on packet sequence numbers of the received plurality of data packets included in the PDCP header. For instance, in an example, if one or more PDCP sequence numbers are missing in the PDCP reorder window, then the processor 742 may determine that the one or more packets are missing in the PDCP reorder window at the PDCP layer and accordingly triggers the PDCP reordering timer to start.

At operation 914, based on the determination that the PDCP reorder timer is running or the PDCP reorder timer has started at the PDCP layer, then it is further determined if the plurality of packets received have the value of TCP ACK bit equals to '1' in the PDCP header or not.

If a result of the determination at the operation 914 is "yes", then the flow of the method 900B proceeds to operation 916. Further, if the result of the determination at the operation 914 is "No", then the flow of the method 900B proceeds to operation 918.

In operation 916, if it is determined by the processor 742 that the one or more packets among the plurality of packets received have the value of TCP ACK bit equals '1' in the PDCP header, then the processor 742 transfers the one or more TCP ACK packets from the PDCP layer to the upper layer. However, at operation 918, if it is determined by the processor 742 that the TCP ACK bit in the PDCP header is not equal to '1' among the plurality of packets then all the packets in the PDCP reordering window will wait till the missing packet has been received or the PDCP reorder timer has expired.

Figure 10:
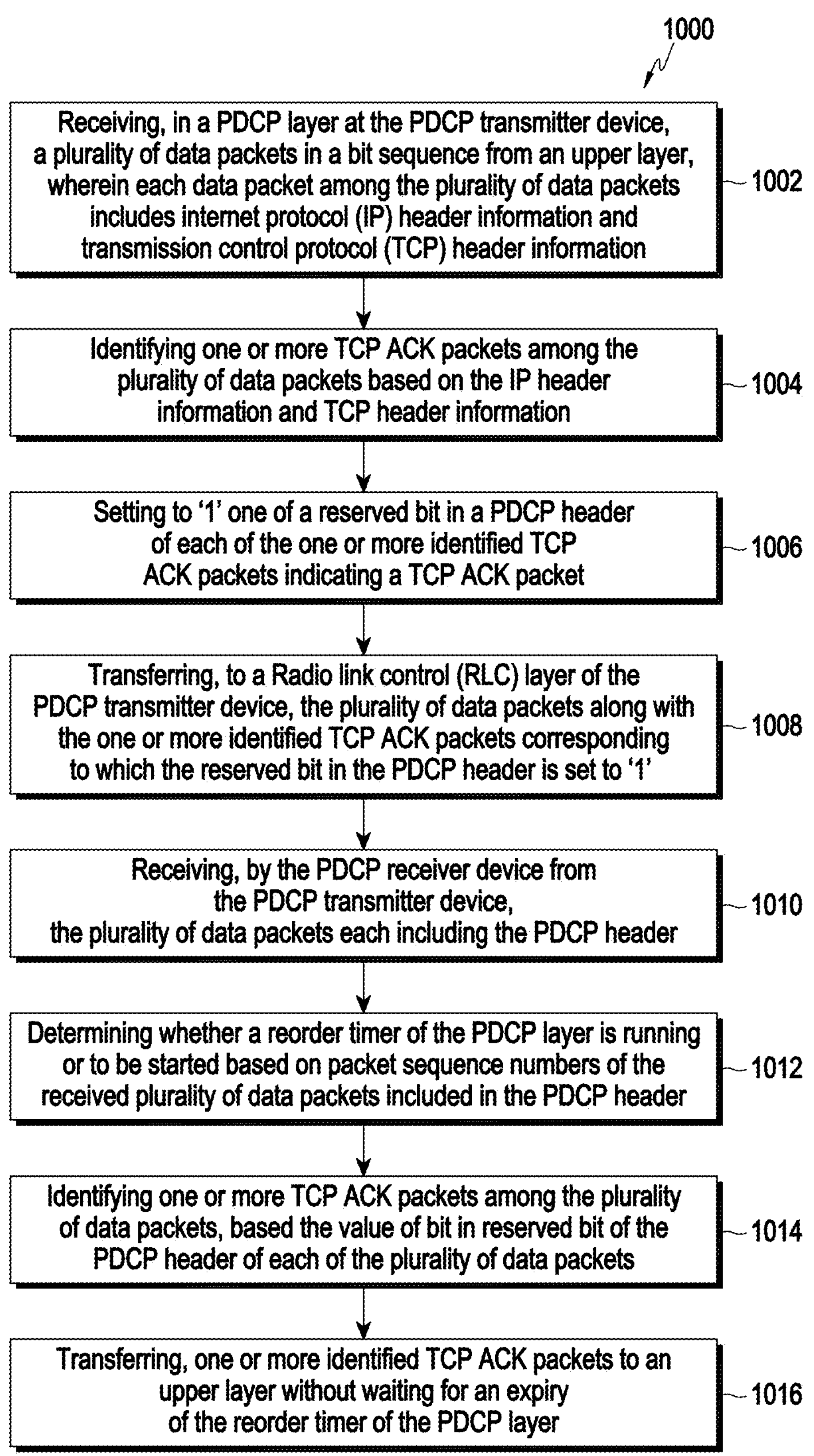
FIG. 10 is a detailed flow diagram of a method for managing the transmission of data packets at the PDCP transmitter device and packet processing at the PDCP receiver device, in accordance with an embodiment of the present disclosure.

FIG. 10 is a detailed flow diagram of a method for managing the transmission of data packets at the PDCP transmitter device and packet processing at the PDCP receiver device, in accordance with an embodiment of the present disclosure. FIG. 10 discloses detailed information described in FIGS. 9A and 9B. The method 1000 includes a series of operations 1002 through 1016 that are performed by the processor 722 of the transmitter device 720 and the processor 742 of the receiver device 740.

At operation 1002, the processor 722 receives the plurality of data packets in the bit sequence in the PDCP layer from the upper layer. Each data packet among the plurality of data packets includes IP header information and TCP header information.

At operation 1004 the processor 722 identifies the one or more TCP ACK packets among the plurality of data packets based on the IP header information and the TCP header information. In an example, the IP header information includes the IP header and the TCP header information includes the TCP header. In a further example, identifying the one or more TCP ACK packets includes determining, corresponding to each data packet, whether a transport protocol in the IP header is TCP and the total length in the IP header is equal to the sum of the length of the IP header and a length of the TCP header. Thus, identifying, as the one or more TCP ACK packets, a set of data packets among the plurality of data packets based on a determination that the transport protocol in the IP header is TCP and the total length in the IP header is equal to the sum of the length of the IP header and the length of the TCP header.

At operation 1006, the processor 722 sets to '1' one of the reserved bits in a PDCP header of each of the one or more identified TCP ACK packets indicating the TCP ACK packet. For instance, the setting of the reserved bit in the PDCP header corresponds to setting one of a PDCP reserved bit as '1' to indicate the TCP ACK packet. Further, the corresponding PDCP reserved bit is referred to as the TCP ACK bit.

At operation 1008, transferring, to a Radio link control (RLC) layer of the PDCP transmitter device, the plurality of data packets along with the one or more identified TCP ACK packets corresponding to which the reserved bit in the PDCP header is set to '1'. As an example the structure of PDU format of the PDCP header is illustrated in FIGS. 12A and 12B, for the ease in understanding the structure and is disclosed below without deviating from the scope of the present disclosure.

Figure 12A:
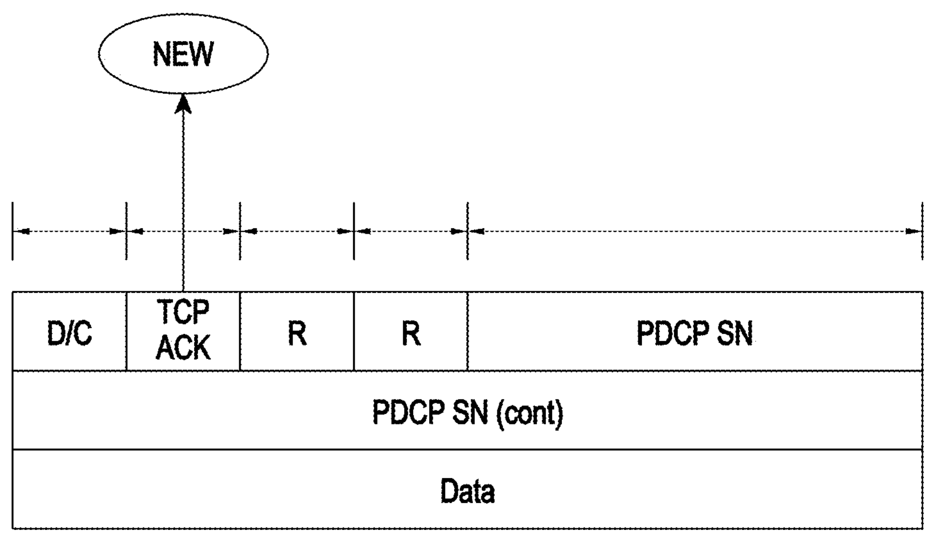
FIG. 12A illustrates a first example PDU format of a PDCP header 12 bit PDCP SN, in accordance with an embodiment of the present disclosure.

FIG. 12A illustrates a first example PDU format of a PDCP Header, in accordance with an embodiment of the present disclosure. As shown in FIG. 12A, the PDU format of the PDCP header includes a plurality of bits including reserve bits. The plurality of bits includes bits representing per-flow PDCP sequence numbers and a TCP ACK bit. The TCP ACK bit corresponds to a reserved bit that is used to indicate TCP ACK only packet and can also be referred to as the TCP ACK BIT. As per the example shown in FIG. 12A, the PDU format of the PDCP header is for 12-bit PDCP SN and includes a D/C (Data/Control Bit), the TCP ACK BIT, two reserved bits, a PDCP SN, and other data. The Data/Control bit indicates the control bits for the PDU.

Figure 12B:
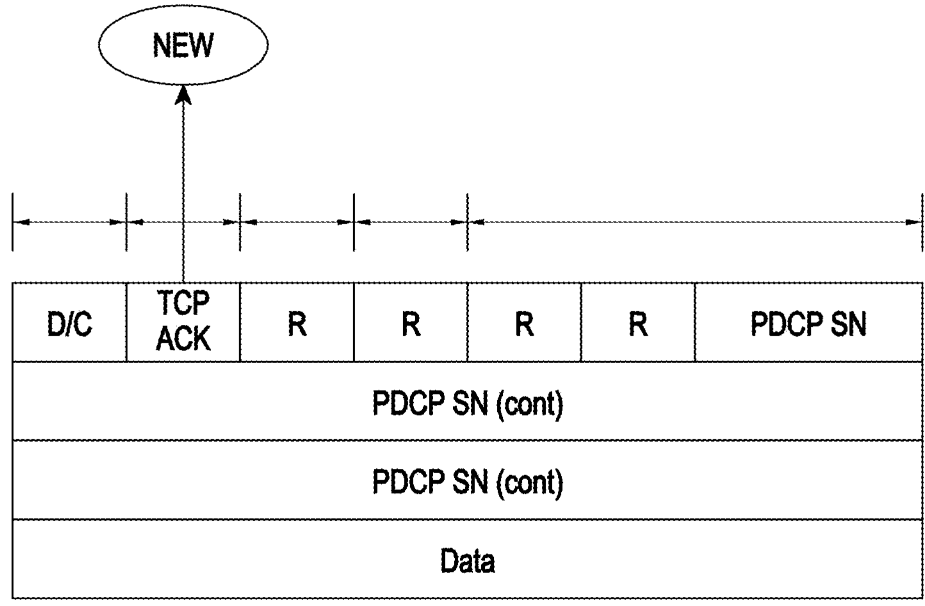
FIG. 12B illustrates a second example PDU format of the PDCP header 18 bit PDCP SN, in accordance with an embodiment of the present disclosure.

FIG. 12B illustrates a second example PDU format of the PDCP Header, in accordance with an embodiment of the present disclosure. FIG. 12B represents the PDU format of the PDCP header includes the plurality of bits including reserve bits. The plurality of bits includes bits representing per-flow packets sequence numbers and a TCP ACK bit. The TCP ACK bit corresponds to a reserved bit that is used to indicate TCP ACK only packet and can also be referred to as the TCP ACK BIT. As per the example shown in FIG. 12B, the PDU format of the PDCP header is of 18-bit PDCP SN and includes a D/C (Data/Control Bit), the TCP ACK BIT, four reserved bits, a PDCP SN, and other data. The Data/Control bit indicates the control bit for the PDU.

After going through the PDU format of the PDCP header, now continuing to operation 1010 of FIG. 10, the processor 742 receives from the PDCP transmitter device, the plurality of data packets each including the PDCP header.

Further at operation 1012, the processor 742 determines whether the reorder timer of the PDCP layer is running or started based on packet sequence numbers of the received plurality of data packets included in the PDCP header. For instance, in an example, if one or more packet sequence numbers are missing in the PDCP reorder window, then the processor 742 may determine that the one or more packets are missing in the PDCP reorder window at the PDCP layer and accordingly triggers the PDCP reordering timer to start.

At operation 1014, identifying the one or more TCP ACK packets among the plurality of data packets, based on the value of the bit in the reserved bit of the PDCP header of each of the plurality of data packets. In an example, the TCP ACK packet corresponds to the packet that only includes information related to acknowledgment without any data.

Accordingly at operation 1016, transferring, the one or more identified TCP ACK packets to the upper layer without waiting for the expiry of the reorder timer of the PDCP layer.

Figure 11:
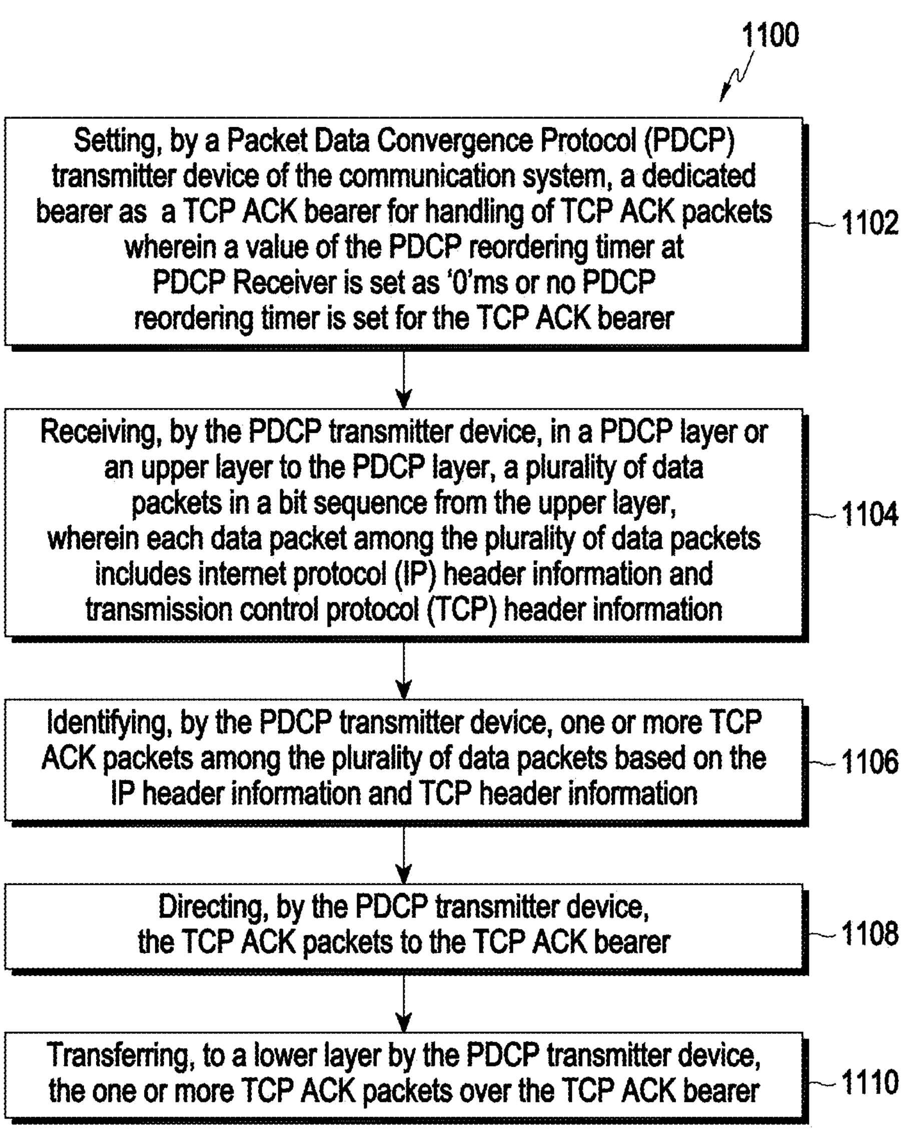
FIG. 11 is a detailed flow diagram of a method implemented in the communication system for efficient management of the TCP ACK packet processing by setting a dedicated radio bearer, in accordance with an embodiment of the present disclosure.

FIG. 11 is a detailed flow diagram of a method implemented in the communication system for efficient management of the TCP ACK packet processing by setting a dedicated radio bearer, in accordance with an embodiment of the present disclosure. The method 1100 includes a series of operations 1102 through 1110 that are performed by the processor 722 of the transmitter device 720 and the operation 1112 by the processor 742 of the receiver device 740.

At operation 1102, the processor 722 sets the dedicated radio bearer as a TCP ACK bearer for handling of the TCP ACK packets. In one or more embodiments, for the TCP ACK bearer at the receiver, a value of the PDCP reordering timer is set as '0' millisecond (ms) or no PDCP reordering timer is set for the TCP ACK bearer. As an example, each TCP ACK packet corresponds to the packet that includes information related to acknowledgment without data.

At operation 1104, the processor 722 receives in the PDCP layer or the upper layer to the PDCP layer, the plurality of data packets in the bit sequence from the upper layer, wherein each data packet among the plurality of data packets includes the IP header information and the TCP header information.

At operation 1106 the processor 722 identifies the one or more TCP ACK packets among the plurality of data packets based on the IP header information and TCP header information.

At operation 1108, the processor 722 directs the TCP ACK packets to the TCP ACK bearer.

At operation 1110, the processor 722 transfers, to a lower layer, the one or more TCP ACK packets over the TCP ACK bearer.

Figure 13:
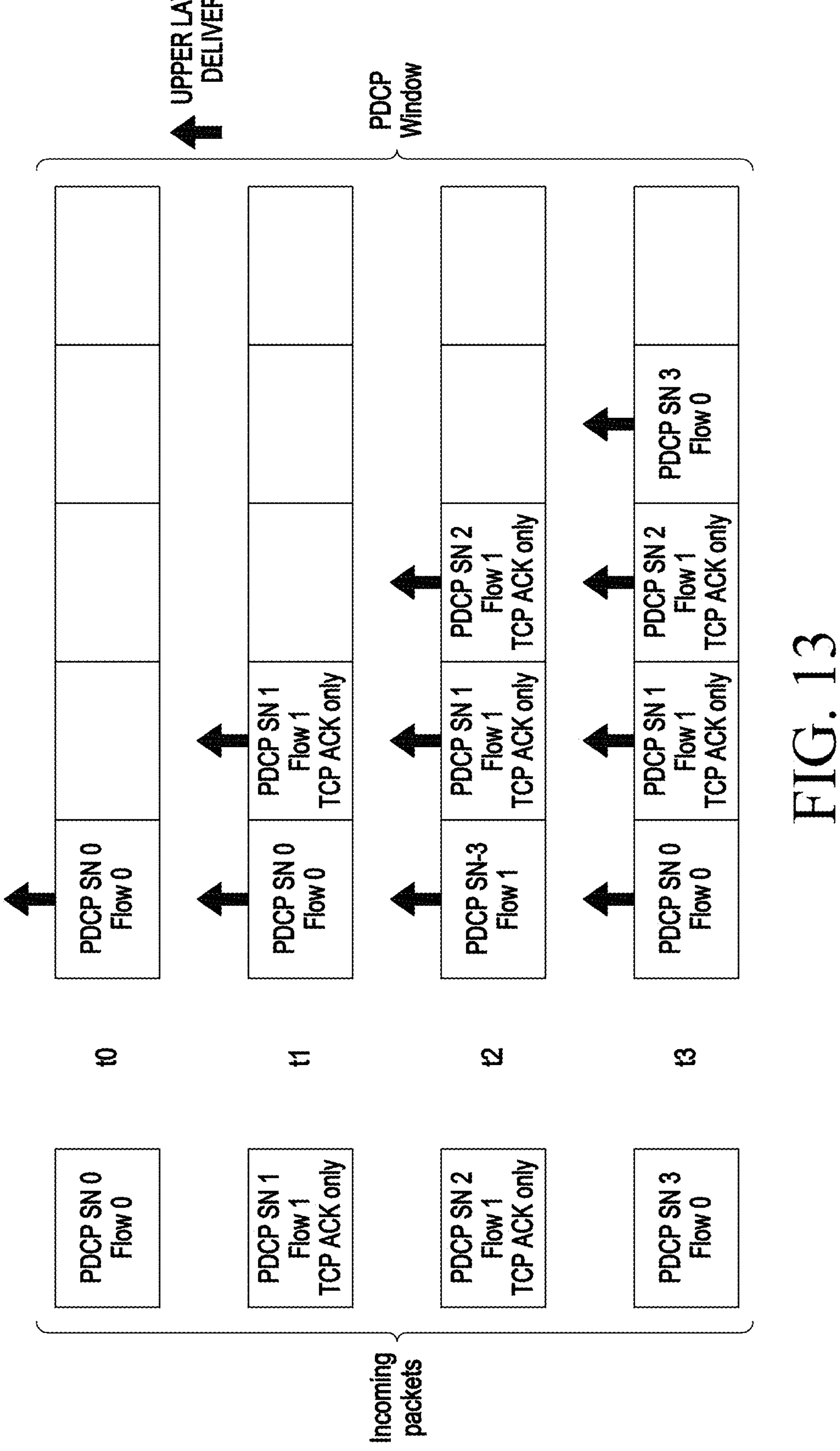
FIG. 13 illustrates a diagram depicting an exemplary scenario for transferring in-order data packets to the upper layer, in accordance with an embodiment of the present disclosure.
Figure 14:
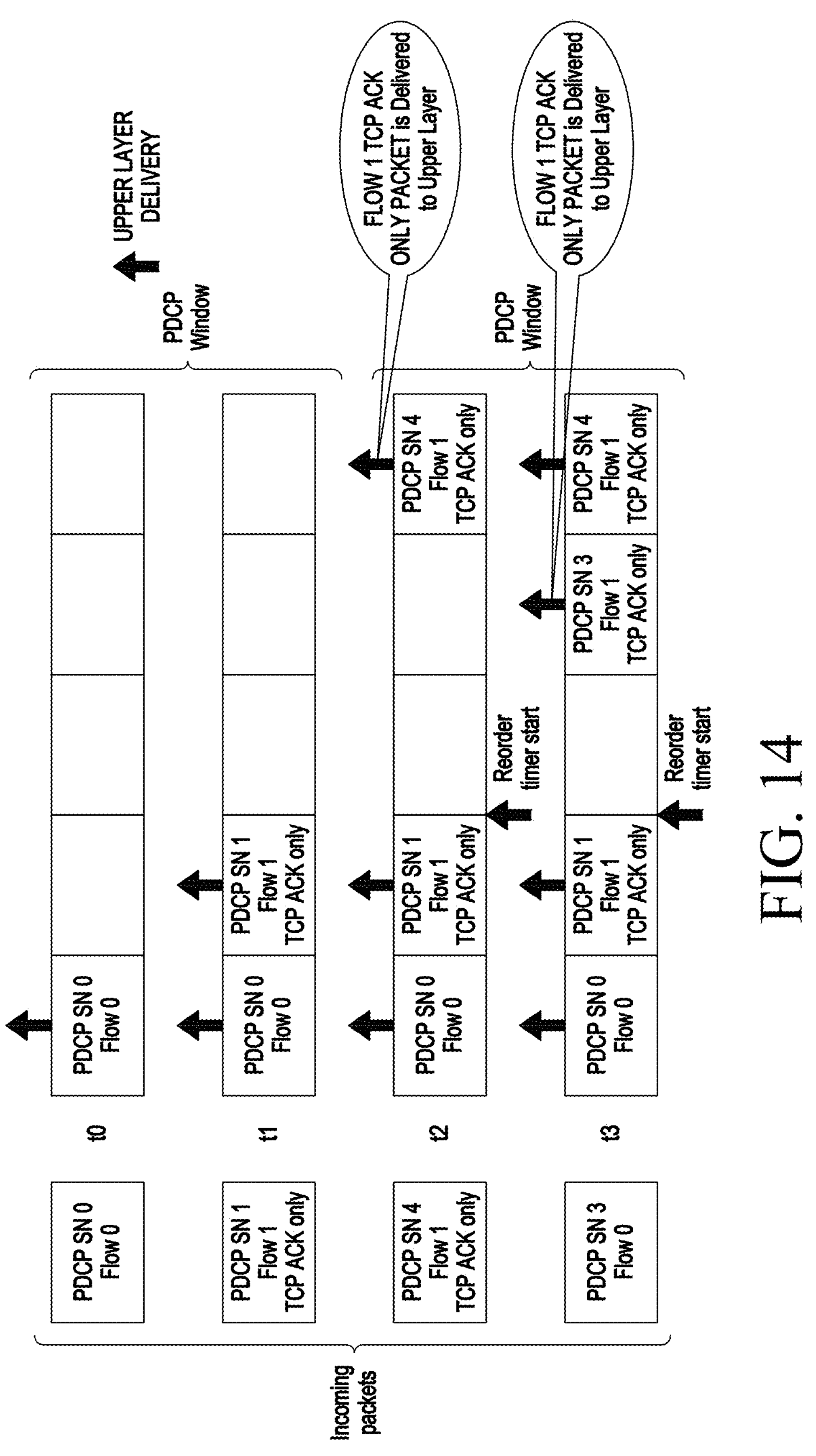
FIG. 14 illustrates a diagram depicting a second exemplary scenario for transferring the TCP Ack only packets to the upper layer when the PDCP reorder timer is running, in accordance with an embodiment of the present disclosure.
Figure 15:
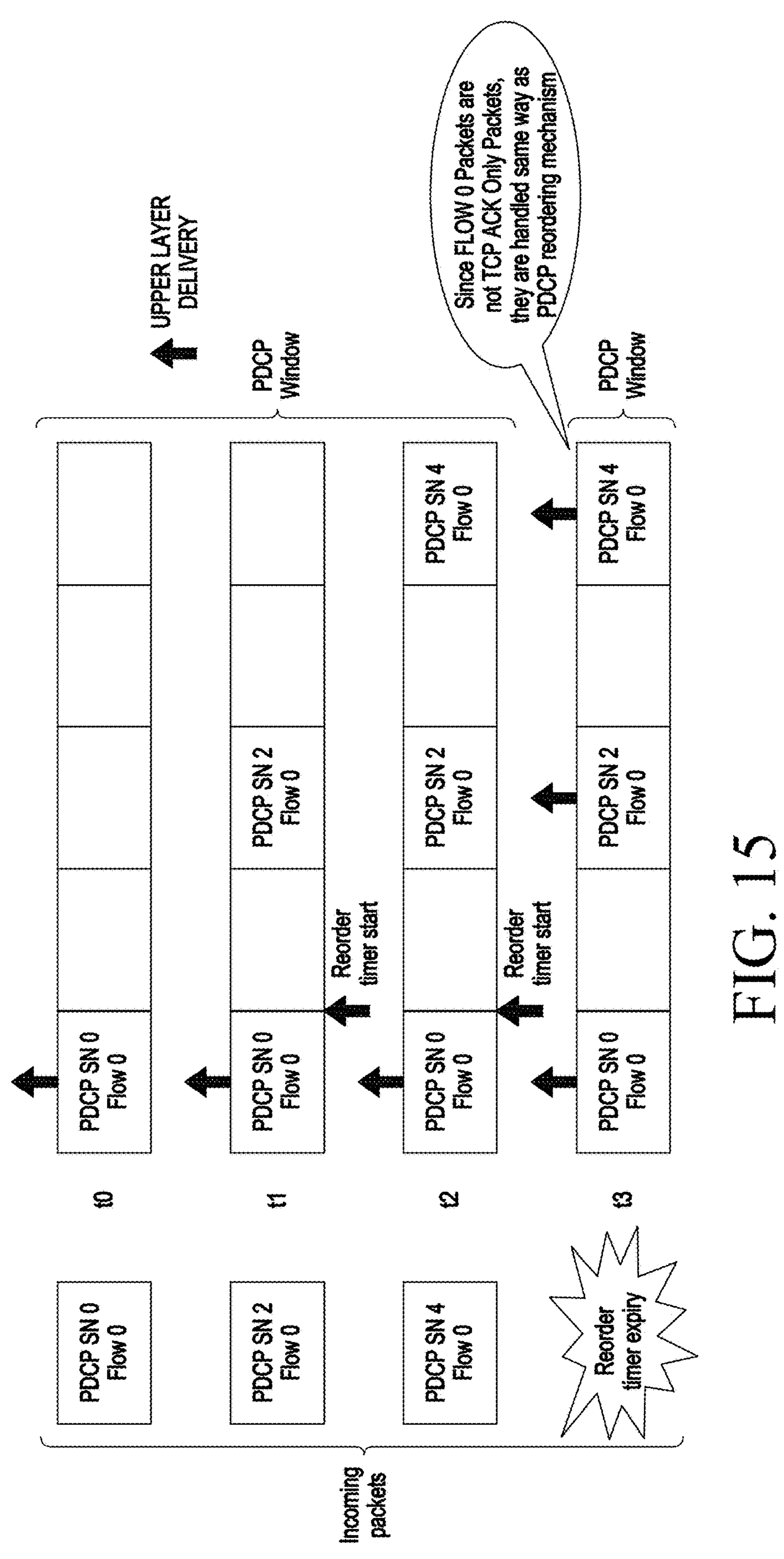
FIG. 15 illustrates a diagram depicting a third exemplary scenario for transferring the data packets to the upper layer when the PDCP reorder timer has expired, in accordance with an embodiment of the present disclosure.

Now an example description will be provided for explaining the method steps of FIG. 8 in detail using FIGS. 13 to 15 of the drawings. FIG. 13 illustrates a diagram depicting an exemplary scenario for transferring in-order data packets to the upper layer, in accordance with an embodiment of the present disclosure. As shown in FIG. 13 there are four data packets (PDCP SN 0, PDCP SN 1, PDCP SN 2, and PDCP SN 3) which are received at the PDCP layer of a receiving device, at a respective time intervals t0, t1, t2, and t3. At each of the respective time t0, t1, t2, and t3 of FIG. 13, it can be seen that none of the data packets (PDCP SN 0, PDCP SN 1, PDCP SN 2, and PDCP SN 3) are missing with respect to the corresponding Flows. Among the received packets, PDCP SN 1 and PDCP SN 2 are TCP ACK only packets without any data. Since, there is no loss of any packet then, each of the four packets including TCP ACK only packets that are received at the PDCP layer are delivered to the upper layer.

FIG. 14 illustrates a diagram depicting a second exemplary scenario for transferring the TCP Ack only packets to the upper layer when the PDCP reordering timer is running, in accordance with an embodiment of the present disclosure. As shown in FIG. 14, four packets (PDCP SN 0, PDCP SN 1, PDCP SN 4, and PDCP SN 3) are received at the PDCP layer of a receiving device, at respective time intervals t0, t1, t2, and t3. Among the received packets, PDCP SN 1, PDCP SN 4, and PDCP SN 3 are TCP ACK only packets without any data. As can be seen from FIG. 14, at time t1, PDCP SN 1 packet is delivered to the upper layer which was the TCP ACK only packet. However, at time t2, the received PDCP SN 4 packet is out of order with respect to PDCP SN, as the data packets with sequence numbers PDCP SN 2 and PDCP SN 3 are missing. Therefore, due to the detection of the missing data packets and the out-of-order data packets, the PDCP reorder timer starts running and waits for the missing packets to arrive at the PDCP layer. However, in the meantime, at time t2 only, identification of packet is performed wherein a type of the packet is determined which can be a TCP data only packet, the TCP ACK only packet, or a TCP data plus ACK packet. When the PDCP SN 4 packet is identified as the TCP ACK only packet, then irrespective of the reorder window being running, the PDCP SN 4 packet is delivered to the upper layer without waiting for the PDCP reordering timer to expire. Similarly, at time t3, the PDCP SN 3 packet is received by the PDCP layer in which the PDCP SN 3 packet is identified as the TCP ACK only packet and accordingly transferred to the upper layer.

FIG. 15 illustrates a diagram depicting a third exemplary scenario for transferring the data packets to the upper layer when the PDCP reorder timer has expired, in accordance with an embodiment of the present disclosure. In accordance with the example shown in FIG. 15, each of the data packets that are out of order with respect to the sequence flow of the PDCP reordering window indicated by the PDCP SN (packet sequence number) are delivered to the upper layer after the expiry of the PDCP reorder timer. As an example, it can be seen from FIG. 15 that when the data packets with the PDCP SN 2 and PDCP SN 4 arrive at the PDCP layer and it is determined that the data packets with the PDCP SN 2 and the PDCP SN 4 are out of order with respect to the PDCP SN. Since FLOW 0 Packets, the PDCP SN 2 and the PDCP SN 4 are not TCP ACK Only Packets, they are handled in the same way as the PDCP reordering mechanism wherein the PDCP SN 2 and the PDCP SN 4 packets will wait in the PDCP reordering window till the expiry of the PDCP reorder timer. Thus, the PDCP SN 2 and the PDCP SN 4 packets are delivered to the upper layer only after the expiry of the PDCP reorder timer.

Referring to the technical abilities and effectiveness of the above-disclosed methods and systems, the one or more TCP ACK only packets can be identified in the PDCP reordering window and accordingly, the one or more TCP ACK only packets can be transferred to the upper layer without waiting for the expiry of the PDCP reorder timer. This transfer helps in efficient calculation of RTT at the TCP server and a faster increase in processing of TCP packets in a congestion window of the TCP server which further results in higher throughput. Additionally, this transfer can significantly help in improving the user experience with higher throughput. Further, as disclosed herein in the above embodiments, for a TCP stream, when the acknowledgment (ACK (N)) that acknowledges N packets is lost and the PDCP layer further receives a subsequent ACK(N+1) that cumulatively acknowledges N+1 packets in the series, then the transmission of the packets continues. Subsequent ACK(N+1) anyway confirms the receptions of packets which are confirmed by ACK(N). Also, the delivery of the one or more TCP ACK only packets in the PDCP reorder window by transferring them to the upper layer while the PDCP reorder timer is running helps in providing improved free buffer status for the PDCP layer at the receiver device. As a result, the error recovery rate for the transport layer protocol can be increased due to a quicker reception of ACK only packets at the TCP server. Furthermore, the transferring of the one or more TCP ACK only packets to the upper layer can also help in segregating packet loss from the server to the receiver device and vice versa.

While specific language has been used to describe the disclosure, any limitations arising on account of the same are not intended. As would be apparent to a person in the art, various working modifications may be made to the method to implement the inventive concept as taught herein.

The drawings and the forgoing description give examples of embodiments. Those skilled in the art will appreciate that one or more of the described elements may well be combined into a single functional element. In an embodiment, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method performed by a receiver device for managing transmission control protocol acknowledgement (TCP ACK) packet processing, comprising:

receiving, from a transmitter device, a plurality of data packets at a packet data convergence protocol (PDCP) layer of the receiver device, each of the plurality of data packets including a PDCP header;

determining whether a reorder timer of the PDCP layer is running or started, based on PDCP sequence numbers of the received plurality of data packets, each of the PDCP sequence numbers being included in the PDCP header, wherein the reorder timer of the PDCP layer is started based on determining that at least one packet is missing while receiving the plurality of packets;

identifying, based on a determination that the reorder timer of the PDCP layer is running or started, one or more TCP ACK packets among the received plurality of data packets; and transferring the identified one or more TCP ACK packets to an upper layer without waiting for an expiry of the reorder timer of the PDCP layer.

2. The method of claim 1, wherein the identifying the one or more TCP ACK packets comprises:

parsing IP header information and TCP header information corresponding to each data packet of a corresponding data radio bearer (DRB); and analyzing a bit sequence of the IP header information and the TCP header information corresponding to the each of the plurality of data packets.

3. The method of claim 2, wherein the IP header information comprises an IP header and the TCP header information comprises a TCP header, and wherein the analyzing the bit sequence of the IP header and the TCP header comprises:

determining, corresponding to the each data packet, whether a transport protocol in the IP header is TCP and a total length in the IP header is equal to a sum of a length of the IP header and a length of the TCP header;

determining, corresponding to the each data packet among the plurality of data packets, whether a TCP ACK bit in the TCP header is SET; and identifying, as the one or more TCP ACK packets, a set of data packets among the plurality of data packets based on a determination that:

the transport protocol in the IP header is TCP, the total length in the IP header is equal to the sum of the length of the IP header and the length of the TCP header, and the TCP ACK bit in the TCP header is SET.

4. The method of claim 1, wherein each of the one or more TCP ACK packets comprises information comprising an acknowledgment without any data.

5. The method of claim 1, wherein a size of the PDCP sequence numbers is one of 12 bits or 18 bits.

6. The method of claim 1, wherein the PDCP header of each of the one or more TCP ACK packets comprise a reserved bit set to '1' to indicate a TCP ACK packet.

7. The method of claim 6, wherein identifying the one or more TCP ACK packets comprises determining whether each of the received plurality of data packets includes the reserved bit set to '1' to indicate the TCP ACK packet.

8. A receiver device for managing transmission control protocol acknowledgement (TCP ACK) packet processing, the receiver device comprising:

memory storing instructions; and one or more processors coupled to the memory, wherein the instructions, when executed by the one or more processors, individually or collectively, cause the receiver device to perform operations comprising:

receiving, from a transmitter device, a plurality of data packets at a packet data convergence protocol (PDCP) layer of the receiver device, each of the plurality of data packets including a PDCP header;

determining whether a reorder timer of a PDCP layer is running or started, based on PDCP sequence numbers of the received plurality of data packets, each of the PDCP sequence numbers being included in the PDCP header, wherein the reorder timer of the PDCP layer is started based on determining that at least one packet is missing while receiving the plurality of packets;

identifying, based on a determination that the reorder timer of the PDCP layer is running or started, one or more TCP ACK packets among the received plurality of data packets; and transferring the identified one or more TCP ACK packets to an upper layer without waiting for an expiry of the reorder timer of the PDCP layer.

9. The receiver device of claim 8, wherein the identifying the one or more TCP ACK packets comprises:

parsing IP header information and TCP header information corresponding to each data packet of a corresponding data radio bearer (DRB); and analyzing, bit sequence of the IP header information and the TCP header information, corresponding to the each data packet of the plurality of data packets.

10. The receiver device of claim 9, wherein the IP header information comprises an IP header and the TCP header information comprises a TCP header, and wherein analyzing the bit sequence of the IP header and the TCP header comprises:

determining, corresponding to the each data packet, whether a transport protocol in the IP header is TCP and a total length in the IP header is equal to a sum of a length of the IP header and a length of the TCP header;

determining, corresponding to the each data packet among the plurality of data packets, whether a TCP ACK bit in the TCP header is SET; and identifying, as the one or more TCP ACK packets, a set of data packets among the plurality of data packets based on a determination that:

the transport protocol in the IP header is TCP, the total length in the IP header is equal to the sum of the length of the IP header and the length of the TCP header, and the TCP ACK bit in the TCP header is SET.

11. The receiver device of claim 8, wherein each of the one or more TCP ACK packets comprises information comprising an acknowledgment without data.

12. The receiver device of claim 8, wherein a size of the PDCP sequence numbers is one of 12 bits or 18 bits.

13. The receiver device of claim 8, wherein the PDCP header of each of the one or more TCP ACK packets comprise a reserved bit set to '1' to indicate a TCP ACK packet.

14. The receiver device of claim 13, wherein the identifying the one or more TCP ACK packets comprises determining whether each of the received plurality of data packets includes the reserved bit set to '1' to indicate the TCP ACK packet.

15. A non-transitory computer readable storage medium storing instructions which, when executed by one or more processors of a receiver device for managing transmission control protocol acknowledgement (TCP ACK) packet processing, cause the receiver device to perform operations, the operations comprising:

receiving, from a transmitter device, a plurality of data packets at a packet data convergence protocol (PDCP) layer of the receiver device, each of the plurality of data packets including a PDCP header;

determining whether a reorder timer of the PDCP layer is running or started, based on PDCP sequence numbers of the received plurality of data packets, each of the PDCP sequence numbers being included in the PDCP header, wherein the reorder timer of the PDCP layer is started based on determining that at least one packet is missing while receiving the plurality of packets;

identifying, based on a determination that the reorder timer of the PDCP layer is running or started, one or more TCP ACK packets among the received plurality of data packets; and transferring the identified one or more TCP ACK packets to an upper layer without waiting for an expiry of the reorder timer of the PDCP layer.

16. The non-transitory computer readable storage medium of claim 15, wherein the identifying the one or more TCP ACK packets comprises:

parsing IP header information and TCP header information corresponding to each data packet of a corresponding data radio bearer (DRB); and analyzing a bit sequence of the IP header information and the TCP header information corresponding to the each data packet of the plurality of data packets.

17. The non-transitory computer readable storage medium of claim 16, wherein the IP header information comprises an IP header and the TCP header information comprises a TCP header, and wherein the analyzing the bit sequence of the IP header and the TCP header comprises:

determining, corresponding to the each data packet, whether a transport protocol in the IP header is TCP and a total length in the IP header is equal to a sum of a length of the IP header and a length of the TCP header;

determining, corresponding to the each data packet among the plurality of data packets, whether a TCP ACK bit in the TCP header is SET; and identifying, as the one or more TCP ACK packets, a set of data packets among the plurality of data packets based on a determination that:

the transport protocol in the IP header is TCP, the total length in the IP header is equal to the sum of the length of the IP header and the length of the TCP header, and the TCP ACK bit in the TCP header is SET.

18. The non-transitory computer readable storage medium of claim 15, wherein each of the one or more TCP ACK packets comprises information comprising an acknowledgment without any data.

19. The non-transitory computer readable storage medium of claim 15, wherein a size of the PDCP sequence numbers is one of 12 bits or 18 bits.

20. The non-transitory computer readable storage medium of claim 15, wherein the PDCP header of each of the one or more TCP ACK packets comprise a reserved bit set to '1' to indicate a TCP ACK packet, and wherein the identifying the one or more TCP ACK packets comprises determining whether each of the received plurality of data packets includes the reserved bit set to '1' to indicate the TCP ACK packet.

* * * * *